US012626561B2

(12) United States Patent
Peters et al.

(10) Patent No.: US 12,626,561 B2
(45) Date of Patent: May 12, 2026

(54) JACKPOT WITH LEADERBOARD-BASED ALLOCATION

(71) Applicant: Games Global Operations Limited, Douglas (IM)

(72) Inventors: Leslie Craig Peters, KwaZulu-Natal (ZA); Theo Naicker, KwaZulu-Natal (ZA)

(73) Assignee: GAMES GLOBAL OPERATIONS LIMITED, Douglas (IM)

( * ) Notice: Subject to any disclaimer, the term of this patent is extended or adjusted under 35 U.S.C. 154(b) by 190 days.

(21) Appl. No.: 18/524,923

(22) Filed: Nov. 30, 2023

(65) Prior Publication Data

US 2025/0182570 A1 Jun. 5, 2025

(51) Int. Cl.
*G07F 17/32* (2006.01)

(52) U.S. Cl.
CPC ........ *G07F 17/323* (2013.01); *G07F 17/3258* (2013.01)

(58) Field of Classification Search
CPC .... G07F 17/32; G07F 17/323; G07F 17/3237; G07F 17/3239; G07F 17/3244; G07F 17/3255; G07F 17/3258; G07F 17/326; G07F 17/3262; G07F 17/3276; G07F 17/34
See application file for complete search history.

(56) References Cited

U.S. PATENT DOCUMENTS 8,012,014 B2 * 9/2011 Low ........................ G07F 17/32 463/16
8,348,753 B2 * 1/2013 Low .................... G07F 17/3272 463/16
10,026,266 B1 * 7/2018 Shahak ............... G07F 17/3267
2004/0235552 A1 * 11/2004 Gauselmann ....... G07F 17/3258 463/16
2006/0046823 A1 * 3/2006 Kaminkow ........... G07F 17/326 463/16
2008/0039194 A1 * 2/2008 Walther .................. G07F 17/32 463/25
2013/0084955 A1 * 4/2013 Davis .................. G07F 17/3272 463/25
2017/0076553 A1 * 3/2017 Washington .......... A63F 13/352
2017/0103615 A1 * 4/2017 Theodosopoulos .......................... G07F 17/3288
2018/0068529 A1 * 3/2018 Delekta ............... G07F 17/3209
2020/0043293 A1 * 2/2020 Nelson ................ G07F 17/3276
2020/0273295 A1 * 8/2020 Visser ................. G07F 17/3276
(Continued)

FOREIGN PATENT DOCUMENTS

WO WO-2009113501 A1 * 9/2009 .......... G07F 17/3211

*Primary Examiner* — Milap Shah
(74) *Attorney, Agent, or Firm* — MCDONNELL BOEHNEN HULBERT & BERGHOFF LLP

(57) ABSTRACT

Systems, methods, and memory devices for a computer-implemented game are disclosed. A leaderboard for the computer-implemented game is generated. The leaderboard includes a list of players that are ranked according to points acquired by each player. A particular player is determined to have triggered a jackpot associated with the computer-implemented game. A trigger portion of a jackpot prize pool is allocated to the particular player. The jackpot prize pool is associated with the jackpot. A leaderboard portion of the jackpot prize pool is allocated among players in the list of players based on a ranking of each player in the list of players.

20 Claims, 18 Drawing Sheets

200

| PRIZE LEVEL | LEADERBOARD POSITION | PRIZE POOL ALLOCATION | NUMBER OF PRIZES | PRIZE AMOUNT |
|---|---|---|---|---|
| 1 | 1 TO 50 | 20% = $800,000 | 50 | $16,000 |
| 2 | 51 TO 250 | 30% = $1,200,000 | 200 | $6,000 |
| 3 | 251 TO 1000 | 50% = $2,000,000 | 750 | $2,666 |

| JACKPOT PRIZE POOL 150 | TRIGGER PORTION 152 | LEADERBOARD PORTION 154 |
|---|---|---|
| $10,000,000 | 60% = $6,000,000 | 40% = $4,000,000 |

(56) References Cited

U.S. PATENT DOCUMENTS

| | | | | |
|---|---|---|---|---|
| 2021/0343104 | A1* | 11/2021 | Stankevich | G07F 17/3209 |
| 2022/0028223 | A1* | 1/2022 | Huke | G07F 17/3272 |
| 2023/0044780 | A1* | 2/2023 | Inamdar | G07F 17/34 |
| 2024/0257611 | A1* | 8/2024 | Silva | G07F 17/3255 |
| 2025/0363870 | A1* | 11/2025 | McIntosh | G07F 17/3279 |
| 2025/0363871 | A1* | 11/2025 | McIntosh | G07F 17/3211 |

* cited by examiner

200

| PRIZE LEVEL | LEADERBOARD POSITION | PRIZE POOL ALLOCATION | NUMBER OF PRIZES | PRIZE AMOUNT |
|---|---|---|---|---|
| 1 | 1 TO 50 | 20% = $800,000 | 50 | $16,000 |
| 2 | 51 TO 250 | 30% = $1,200,000 | 200 | $6,000 |
| 3 | 251 TO 1000 | 50% = $2,000,000 | 750 | $2,666 |

300

| GAME | JACKPOT LEADERBOARD CONFIGURATION | JACKPOT PRIZE AMOUNT (%) | JACKPOT LEADERBOARD POOL AMOUNT (%) |
|---|---|---|---|
| GAME A | NONE | 100% = $10,000,000 | 0% = $0 |
| GAME B | GLOBAL | 40% = $4,000,000 | 60% = $6,000,000 |
| GAME C | MARKET | 75% = $7,500,000 | 25% = $2,500,000 |
| GAME C | BRAND | 25% = $2,500,000 | 75% = $7,500,000 |

JACKPOT PRIZE POOL 150

$10,000,000

FIGURE 3

400

| GAME | JACKPOT LEADERBOARD CONFIGURATION | JACKPOT PRIZE AMOUNT | JACKPOT LEADERBOARD POOL AMOUNT |
|---|---|---|---|
| GAME A | NONE | $9,000,000 | $0 |
| GAME B | GLOBAL | $9,000,000 | $1,000,000 |

FIGURE 4

500

| GAME | JACKPOT LEADERBOARD CONFIGURATION | JACKPOT PRIZE AMOUNT | JACKPOT LEADERBOARD POOL AMOUNT |
|---|---|---|---|
| GAME A | NONE | $9,000,000 | $0 |
| GAME B | GLOBAL | $9,000,000 | $1,000,000 |
| GAME B | MARKET | $9,000,000 | $500,000 |

FIGURE 5

600

| GAME | JACKPOT LEADERBOARD CONFIGURATION | JACKPOT PRIZE AMOUNT | JACKPOT LEADERBOARD POOL AMOUNT |
|---|---|---|---|
| GAME A | NONE | $9,000,000 | $0 |
| GAME B | GLOBAL | $9,000,000 | $1,000,000 |
| GAME B | MARKET | $9,000,000 | $500,000 |
| GAME B | BRAND | $9,000,000 | $20,000 |

FIGURE 6

700

| MAIN PRIZE AMOUNT | BET CONTRIBUTION % TO MAIN PRIZE | JACKPOT LEADERBOARD POOL AMOUNT |
|---|---|---|
| $0 - $10,000,000 | 50% | 50% |
| $10,000,000+ | 10% | 90% |

FIGURE 7

800

| GAME | JACKPOT LEADERBOARD CONFIGURATION | JACKPOT PRIZE AMOUNT | JACKPOT LEADERBOARD POOL AMOUNT |
|---|---|---|---|
| GAME A | NONE | 100% = $10,000,000 | 0% = $0 |
| GAME B | GLOBAL | 40% = $4,000,000 | 60% = $6,000,000 |

FIGURE 8

1000

| JACKPOT ID | PLAYER ID | BET AMOUNT | JACKPOT CONTRIBUTION |
|---|---|---|---|
| 2 | 123 | $0.50 | $0.05 |
| 1 | 324 | $1.00 | $0.10 |
| 4 | 456 | $2.00 | $0.20 |
| ... | ... | ... | ... |

FIGURE 10

1100

| JACKPOT ID | PLAYER ID | BET AMOUNT | JACKPOT CONTRIBUTION | JACKPOT POINTS |
|---|---|---|---|---|
| 2 | 123 | $0.50 | $0.05 | 1 |
| 1 | 324 | $1.00 | $0.10 | 7 |
| 4 | 456 | $2.00 | $0.20 | 2 |
| ... | ... | ... | ... | ... |

FIGURE 11

1200

| JACKPOT ID | PLAYER ID | JACKPOT POINTS |
|---|---|---|
| 178 | 123 | 10 |
| 178 | 324 | 776 |
| 178 | 456 | 2332 |
| ... | ... | ... |

FIGURE 12

1300

| JACKPOT ID | PLAYER ID | BET AMOUNT | JACKPOT CONTRIBUTION | JACKPOT POINTS | JACKPOT POINTS ACTIVE |
|---|---|---|---|---|---|
| 2 | 123 | $0.50 | $0.05 | 1 | TRUE |
| 1 | 324 | $1.00 | $0.10 | 7 | TRUE |
| 4 | 456 | $2.00 | $0.20 | 2 | FALSE |
| ... | ... | ... | ... | ... | ... |

FIGURE 13

JACKPOT WITH LEADERBOARD-BASED ALLOCATION

FIELD

This disclosure relates to a computer-implemented game.

BACKGROUND

Current progressive jackpot technology allows for a single user to win an entire jackpot prize pool. As users take part in a progressive jackpot game, a percentage of each wager placed is used to fund (e.g., grow) a progressive jackpot prize pool. The progressive jackpot prize pool typically continues to grow until a particular user triggers the jackpot. In this scenario, the particular user wins the entire value of the progressive jackpot prize pool. After the particular user triggers the jackpot, the progressive jackpot prize pool resets to a starting amount and grows again until another user triggers the jackpot.

Because the particular user receives the entire value of the progressive jackpot prize pool, other users (e.g., non-winning players) that contributed to the progressive jackpot prize pool do not receive any portion of the progressive jackpot prize pool. Thus, the non-winning players may not join in a collective celebration, while the particular user that triggered the jackpot receives a life-changing prize.

OVERVIEW

The present application discloses embodiments including and/or related to systems, methods, and apparatus that provide improvements in a computer-implemented game by allocating a portion of a jackpot prize pool among multiple players to increase the amount of jackpot beneficiaries.

In a first aspect, a method is provided. The method includes generating, by a processor, a leaderboard for a computer-implemented game. The leaderboard includes a list of players that are ranked according to points acquired by each player. The method also includes determining, by the processor, that a particular player triggered a jackpot associated with the computer-implemented game. The method also includes allocating, by the processor, a trigger portion of a jackpot prize pool to the particular player. The jackpot prize pool is associated with the jackpot. The method also includes allocating, by the processor and based on a ranking of each player in the list of players, a leaderboard portion of the jackpot prize pool among players in the list of players.

In a second aspect, a computing system is provided. The computing system includes a processor and a non-transitory computer-readable memory comprising executable instructions. Execution of the executable instructions by the processor cause the processor to perform operations. The operations comprise generating a leaderboard for a computer-implemented game. The leaderboard includes a list of players that are ranked according to points acquired by each player. The operations also comprise determining that a particular player triggered a jackpot associated with the computer-implemented game. The operations also comprise allocating a trigger portion of a jackpot prize pool to the particular player. The jackpot prize pool is associated with the jackpot. The operations also comprise allocating, based on a ranking of each player in the list of players, a leaderboard portion of the jackpot prize pool among players in the list of players.

In a third aspect, a non-transitory computer-readable medium is provided. The non-transitory computer-readable medium comprises instructions that, when executed by a processor, cause the processor to perform functions. The functions comprise generating a leaderboard for a computer-implemented game. The leaderboard includes a list of players that are ranked according to points acquired by each player. The functions also comprise determining that a particular player triggered a jackpot associated with the computer-implemented game. The functions also comprise allocating a trigger portion of a jackpot prize pool to the particular player. The jackpot prize pool is associated with the jackpot. The functions also comprise allocating, based on a ranking of each player in the list of players, a leaderboard portion of the jackpot prize pool among players in the list of players.

These aspects, as well as other embodiments, aspects, advantages, and alternatives will become apparent to those of ordinary skill in the art by reading the following detailed description, with reference where appropriate to the accompanying drawings. Further, this overview and other descriptions and figures provided herein are intended to illustrate embodiments using examples only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

The above, as well as additional, features will be better understood through the following illustrative and non-limiting detailed description of example embodiments, with reference to the appended drawings.

FIG. 3 is another table illustrating an example prize pool allocation to players on a leaderboard in accordance with the example embodiments.

FIG. 4 is another table illustrating an example prize pool allocation to players on a leaderboard in accordance with the example embodiments.

FIG. 5 is another table illustrating an example prize pool allocation to players on a leaderboard in accordance with the example embodiments.

FIG. 6 is another table illustrating an example prize pool allocation to players on a leaderboard in accordance with the example embodiments.

FIG. 7 is a table illustrating an example of building a progressive jackpot in accordance with the example embodiments.

FIG. 8 is a table illustrating an example of merging a new progressive game that allocates a progressive jackpot with leaderboard players with an existing progressive jackpot game in accordance with the example embodiments.

FIG. 10 is a table illustrating a jackpot configuration table in accordance with the example embodiments.

FIG. 11 is another table illustrating a jackpot configuration table in accordance with the example embodiments.

FIG. 12 is a table used to generate a jackpot leaderboard in accordance with the example embodiments.

FIG. 13 is another table illustrating a jackpot configuration table in accordance with the example embodiments.

Figure 1:
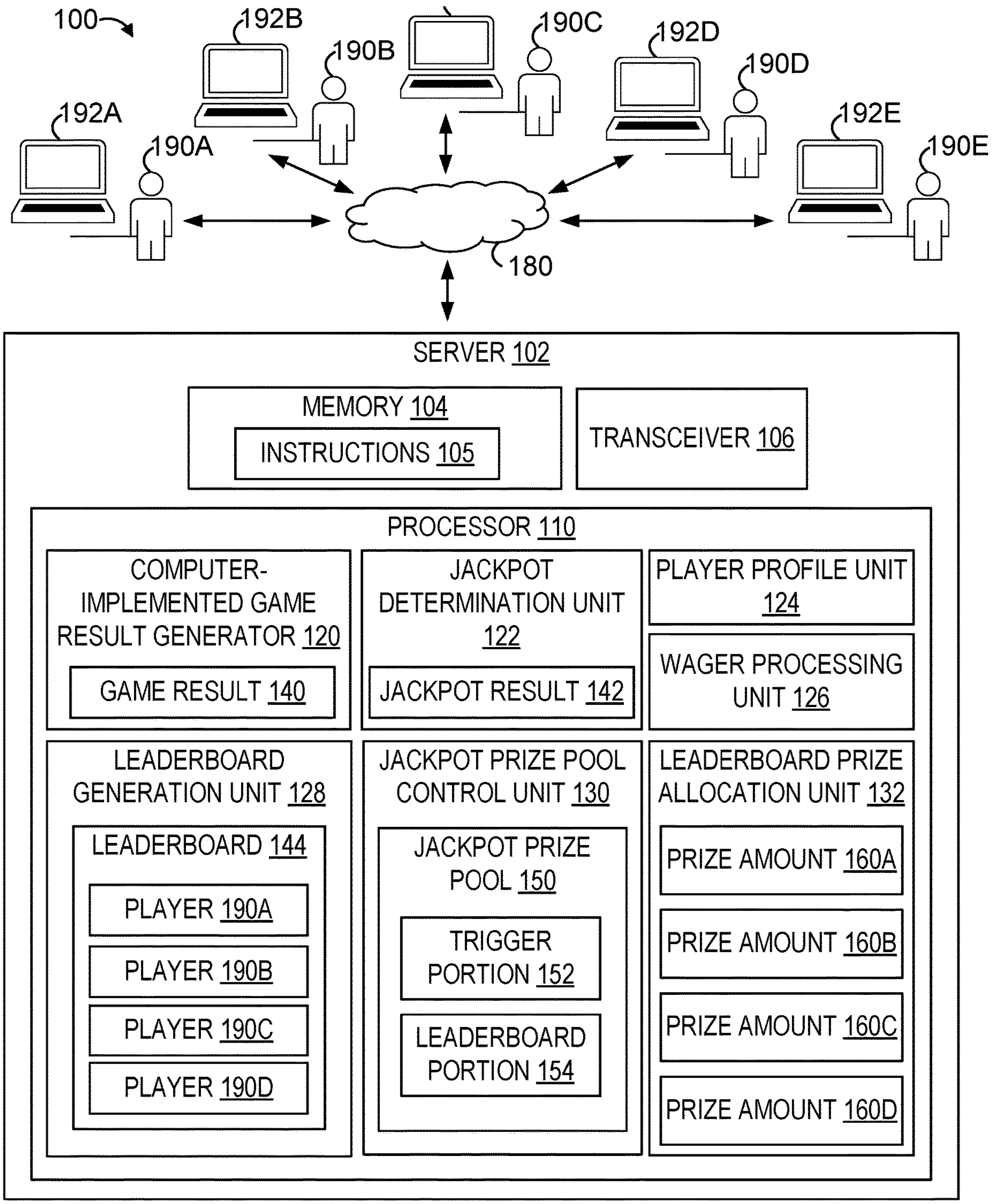
FIG. 1 is a block diagram of a system in accordance with the example embodiments.

All the figures are schematic, not necessarily to scale, and generally only show parts which are necessary to explain example embodiments, wherein other parts can be omitted or merely suggested.

DETAILED DESCRIPTION

I. Introduction

In this detailed description, several example embodiments are disclosed including, but not limited to, embodiments pertaining to allocating a portion of a jackpot prize pool of a computer-implemented game (e.g., a digital, electronic game) among a list of players on a leaderboard. Thus, when a particular player triggers a jackpot condition, the particular player is awarded a trigger portion of the jackpot prize pool and the remaining portion of the jackpot prize pool is allocated among players on the leaderboard. To illustrate, according to the techniques described herein, the computer-implemented game provides a way in which more than one player can benefit from the awarding of a jackpot prize, despite the jackpot prize being triggered by someone else. Thus, the player that triggered the jackpot prize is not the only recipient of prize money from the jackpot prize pool. Players can be informed of their potential winnings during gameplay, before the jackpot has been triggered and won.

In one implementation, players that participate in the computer-implemented game are ranked on a leaderboard according to a particular criteria. As a non-limiting example, the players that participate in the computer-implemented game can be ranked according to a points-based ranking system that depends on characteristics of player gameplay. The jackpot prize pool can have a trigger portion and a leaderboard portion. The trigger portion is awarded to the player that triggers the jackpot, and the leaderboard portion is allocated among the players on the leaderboard based on the each player's ranking.

Example Embodiment

As a non-limiting example, a jackpot may have a total prize pool of $10,000,000. According to the rules of allocating the portions of the prize pool, the trigger portion can be sixty percent (60%) of the jackpot prize pool (i.e., $6,000,000), and the leaderboard portion can be forty percent (40%) of the jackpot prize pool (i.e., $4,000,000). During gameplay, all players may be shown the trigger portion (e.g., the prize for triggering the jackpot). In some scenarios, the leaderboard portion can also be shown. The leaderboard prizes can be displayed as a total value or as a "per player" value. When a player triggers the jackpot, being $6,000,000 in this instance, all other players in winning positions on the leaderboard may receive a predetermined share of the leaderboard prize, being $4,000,000 in this example.

In some scenarios, there may be multiple prize levels on the leaderboard. As a non-limiting example, one-thousand (1000) players can be included on the leaderboard, and the leaderboard can have three prize levels, with Prize Level One (1) being the highest level and Prize Level Three (3) being the lowest prize level. In one implementation, the fifty (50) highest ranked players are associated with Prize Level One (1), the next two-hundred (200) highest ranked players are associated with Prize Level Two (2), and the last seven-hundred and fifty (750) highest ranked players are associated with Prize Level Three (3). If the jackpot is triggered, the fifty (50) players associated with Prize Level One (1) can collectively share twenty percent (20%) of the jackpot prize pool (e.g., $800,000), or $16,000 for each player. The two-hundred (200) players associated with Prize Level Two (2) can collectively share thirty percent (30%) of the jackpot prize pool (e.g., $1,200,000), or $6,000 for each player. The seven-hundred and fifty (750) players associated with Prize Level Three (3) can collectively share fifty percent (50%) of the jackpot prize pool (e.g., $2,000,000), or $2,666 for each player. In this example there are only three prize levels and one-thousand (1000) prizes available according to leaderboard positions. In some implementations, the number of prize levels and the number of prizes can be configurable, so that any desired configuration can be provided.

In some scenarios, the winner of the trigger portion may be eligible for their share of the leaderboard portion. If, in the above example, the one-hundredth highest ranked player triggers the jackpot, they may receive $6,000 in addition to their trigger portion of $6,000,000. This may, again, can be configurable for a particular desired application.

Leaderboard

The leaderboard can be based on different criteria. According to one example, the leaderboard can be implemented using a points-based system, where players are ranked according to the points they have acquired during gameplay. A player could, for example, be allocated one point for every $0.10 that they place as wagers in the computer-implemented game. The player with the highest number of points, i.e. the highest value in wagers placed on the computer-implemented game, may be awarded accordingly.

Points could also be allocated for other reasons. For example, a random multiplier may be applied during gameplay, so that a player is able to receive more points than normal. If, for example, a 100× point-specific multiplier is activated during a game iteration (e.g., a spin of a wheel) with a $0.10 wager, the player may receive one-hundred (100) points instead of the normal one (1) point. This would add additional excitement to the accumulation of points. Multipliers could be randomly offered in any format, for example 10×, 20×, 50×, 100×, or the like.

Another example could be to reward a player using points for a potential bad experience. If, for example, a player has three losing spins in a row (i.e., the player does not win any return for three rounds of gameplay), the player may be offered double their points on the next wager they place on the game. After five consecutive losing spins, the player may be offered triple their points. After seven consecutive losing spins, the player may be offered quadruple their points, etc. This may provide a losing player with a more enjoyable experience.

Points may be allocated for other reasons as well. For example, an operator may wish to allocate points based on a player's usage of their account. For example, points may be awarded for logging in daily, for depositing money into a playing wallet, and the like. Operators may be allowed to configure the rules according to which points are allocated. Such allocation of points for a leaderboard may provide a significant additional favourable experience to players participating in a jackpot game.

Configuration Levels

In some implementations, a jackpot can be configured at various levels, with rules applicable to each level. For example, there may be a Global Level Leaderboard where all players across all participating computer-implemented games are combined into a global jackpot leaderboard. There may also be a Market Level Leaderboard that provides a leaderboard in a particular market. There may also be a Brand Level Leaderboard that ranks players for a single operator/online casino.

Multiple Level Example

In some implementations, several computer-implemented games can be associated with the same jackpot prize pool. Some computer-implemented games may have a leaderboard, and others may not have a leaderboard. Computer-implemented games with a leaderboard may have different leaderboards.

For the following illustration, let's assume that three different computer-implemented games (e.g., Game A, Game B, and Game C) share the same jackpot prize pool of $10,000,000. Game A may not have a leaderboard and may be a traditional progressive jackpot game. All players in Game A will see a prize worth $10,000,000. If a player in Game A wins the jackpot, such player will win the full prize. Game B may have a Global Level Leaderboard, which accounts for sixty percent (60%) of the jackpot prize pool. In Game B, the players will see a jackpot prize (e.g., a trigger portion) worth $4,000,000 and a jackpot leaderboard prize pool (e.g., a leaderboard portion) worth $6,000,000. Since this is a Global Level Leaderboard, every player playing in Game B will see a Global Level Leaderboard. If a player in Game B wins the jackpot, such player will win forty percent (40%) of the jackpot prize pool, while the remaining sixty percent (60%) of the jackpot prize pool will be allocated among the players on the Global Level Leaderboard. Game C may have a Market Level Leaderboard, which accounts for twenty-five percent (25%) of the jackpot prize pool. In Game C, the players will see a jackpot prize (e.g., a trigger portion) worth $7,500,000 and a leaderboard prize pool (e.g., a leaderboard portion) of $2,500,000. Since this is a Market Level Leaderboard, only players playing in the specific market (for example, only in the USA, in a particular state in the USA, or the like) will see this Market Level Leaderboard. It may be possible that players who are not part of the specific market could see and take part on a Global Level Leaderboard. Game C can also have a Brand Level Leaderboard which applies to a specific operator brand. This Brand Level Leaderboard can be worth seventy-five percent (75%) of the jackpot prize pool. In this game, the players who are utilizing the services of the particular brand would see a jackpot prize (e.g., a trigger portion) worth $2,500,000 and a jackpot leaderboard prize pool (e.g., a leaderboard portion) worth $7,500,000.

In the above examples, it should be noted that Games A, B and C all play for the same jackpot pool, and the allocation of winnings are determined by the playing characteristics of the player triggering the jackpot. A particular game can have no jackpot leaderboard or multiple levels of configuration. In the above example, Game C has both a Market Level Leaderboard and a Brand Level Leaderboard. The particular player winning the jackpot may determine the allocation of the winnings.

Thus, in the above examples, if a player in Game A wins the jackpot, no leaderboard payouts will be applicable. If a player in Game B wins the jackpot, Game B's leaderboard players would share sixty percent (60%) of the jackpot prize pool, while the players on the leaderboard of Game C would not receive anything. If a player in Game C wins the jackpot, and that player was participating in the Market Level Leaderboard, then all those players on the Market Level Leaderboard would win a share of the winnings. If the winning player was participating in the Brand Level Leaderboard, then all those players on the Brand Level leaderboard would receive a share of the winnings prize.

A Brand Level Leaderboard may override or take preference over a relevant Market Level Leaderboard, i.e. if a player in a particular market plays Game C with a particular operator, the configuration of the operator may override the configuration of the particular marketplace. A particular operator may thus have their own leaderboard, and if any one of their players wins the jackpot, their own players may share in the winnings.

In some embodiments, a player may be allowed to choose which leaderboard they wish to take part in if more than one leaderboard may be applicable to them. While a user's likelihood of triggering the jackpot themselves will remain the same for any player, the player's chance of receiving a share of any triggered jackpot may change based on the leaderboard they take part in. A particular operator may have a one-thousand (1000) person leaderboard, while another may have a one-hundred (100) person leaderboard. In addition, the more players in a particular market (for a Market Level Leaderboard) or with a particular operator (for a Brand Level Leaderboard), the greater the possibility that one of the players taking part in the same leaderboard may trigger the particular jackpot, leading to a share of the winnings between all players on the particular leaderboard.

Multiple Jackpot Pools

In the above multiple level example, a single jackpot prize of $10,000,000 could be allocated to a single winner, or could be split between a winner and players on a leaderboard. In some scenarios, there may be two different prize pools, one for the jackpot prize, and one for the leaderboard prizes. With two separate pools, configuration of the system would be more complex, but would allow for greater control over winning allocations.

One example may be a jackpot prize pool of $9,000,000, and a leaderboard prize pool of $1,000,000. If a player in Game A wins the main jackpot prize, there will not be a winner on the Global Level Leaderboard. The main jackpot prize would reset back to its starting amount, and the jackpot leaderboard will continue from its current $1,000,000.

This can also be applied to a Market Level Leaderboard or Brand Level Leaderboard. For example, players taking part in Game B's Global Level Leaderboard can win its leaderboard amount, and players taking part in Game B's Market Level Leaderboard can win its leaderboard amount (depending on which player triggers the jackpot and wins the main prize). Since the jackpot prize amount and the leaderboard prize amount is separated, players can take part in both the Global and the Market Level Leaderboards at the same time. So, if a player plays in Game B, and takes part in both leaderboards, they can win the main jackpot and trigger payouts of both leaderboards, to be paid from the relevant prize pool. If a player that does not take part in the Market Level Leaderboard, but only in the Global Level Leaderboard, wins the jackpot prize, only the Global Level Leaderboard will pay out, and not the Market Level Leaderboard. The market prize pool may then remain at that particular level, while the global prize pool may reset.

The above techniques can also be extended to a brand level. For example, a Brand Level Leaderboard may be localized to the players in the operator's brand. It will only be won when a player from the operator's brand wins the main jackpot prize. This would naturally be a smaller group of players on the jackpot leaderboard and create a unique offering for the operator's brand. Players in this brand who are also in the specific market would then be participating in three jackpot leaderboards i.e. Global, Market and Brand.

Independent Trigger of Leaderboard Jackpot

In all of the above examples, awarding the leaderboard prize (e.g., the leaderboard portion) is linked to a trigger of the primary jackpot. This may be combined with some other trigger, whereby the leaderboard jackpot could be triggered in other circumstances as well. As a non-limiting example, the jackpot may be triggered using a time-based trigger. Take, for example, a simple example where the leaderboard payout will trigger every thirty (30) days. The trigger may be that if the main jackpot prize has not been won for thirty (30) consecutive days, the leaderboard pays out without such win.

As another non-limiting example, the jackpot may be triggered when a top player on the leaderboard reaches a specific point or other criteria. For example, if the top player obtains a particular amount of points, plays for a particular amount of consecutive days, etc. As another non-limiting example, the jackpot may be triggered when the sum of all points by players on the leaderboard reaches a particular point.

Various combinations of trigger conditions could be combined. This may create excitement around the jackpot leaderboard, and, importantly, may ensure that at every level of the jackpot leaderboard configuration it can be triggered independently of the main jackpot prize.

When considering the Brand Level Leaderboard, it is possible that the main jackpot prize will not be won by a player of the particular brand for an extended time. Allowing the Brand Level Leaderboard payout to be triggered periodically and independent of the main jackpot prize may ensure that the players associated with the particular brand get a periodic payout, leading to a better overall experience for players of the particular brand.

If any jackpot leaderboard pool is linked to a single jackpot pool by way of a percentage (for example, the leaderboard is allocated thirty percent (30%) of the total prize pool when the main jackpot is triggered), any independent trigger conditions may account for this. When a jackpot leaderboard is paid out due to an external trigger (i.e., not due to the main jackpot being won), it would draw funds from the single prize pool, and all jackpot allocations could be affected. For example, if main prize receives seventy percent (70%) of the jackpot prize pool and the leaderboard portion receives thirty percent (30%) of the jackpot prize pool, the remaining seventy percent (70%) may be split between the main prize winner and any leaderboard payouts. As a result, there would need to be a link between the external triggers for the leaderboard jackpot and the main jackpot.

There may be, for example, an adjustment of the contribution of the full prize fund to the jackpot leaderboard if the leaderboard jackpot is won without the main jackpot having been triggered. For example, where the default is a 70-30 split, and the thirty percent (30%) portion is won, the split may be dynamically adjusted to 95-5. This could reduce the effect on the overall jackpot prize, while still allocating value to the leaderboard payout.

Jackpot Contributions

With progressive jackpots, a percentage of each wager placed on a game taking part generally funds the jackpot. For example, $0.01 of every $1.00 wagered may be added to the jackpot prize pool. The same funding model may be applied herein, with the pool being funded by wagers placed on the game.

In a system using a single prize pool, the percentage allocation between the primary jackpot prize and the leaderboard prize may be changed over time, based on the value of the jackpot pool. For example, if the pool reaches a predetermined value, the leaderboard percentage split may gradually increase. In one example, the split starts at seventy-five percent (75%) to the main prize, and twenty-five percent (25%) to the leaderboard payouts. When the prize pool reaches a value of $10,000,000, the jackpot leaderboard percentage may be gradually increased such that the leaderboard is allocated more of the money. This may be employed when the main prize has reached a high enough value such that it warrants a bigger split for the leaderboard positions.

If separate pools are used, bet contributions from gameplay may be split into the pools as per the percentage split between the prizes. Again, dynamic adjustment may be done if the main prize pool reaches a high enough level.

Dynamic adjustment of contribution may also be possible, with either the main jackpot pool or leaderboard pool being allowed to grow faster or slower when appropriate. For example, while the main jackpot prize pool is worth less than $10,000,000, the prize pool contributions can be split 50-50. Once the main jackpot prize pool exceeds $10,000,000, the prize pool contributions can be split 10-90, with the leaderboard jackpot pool increasing at a faster rate than the main jackpot prize pool.

A similar allocation may be made where a single pool is used. In such a situation, a dynamic adjustment may need to be made to the percentage win split instead of the actual contribution made to each pool. In some embodiments, players may not be shown a percentage split of the prize pool, but the values allocated to each (leaderboard vs main prize) instead. This may avoid showing a dynamically updating percentage split where a single prize pool is used.

Modifying Existing Progressive Jackpot Prize Pools

In some scenarios, the allocation techniques described above can be applied to existing progressive jackpot. When introduced, the leaderboard value can be funded by (1) reallocation of the current jackpot pool to a percentage split or into a separate pool, (2) staring a new, separate jackpot leaderboard pool, or (3) creating a new game, using the same jackpot.

As a non-limiting example, an existing jackpot may be running with a main prize of $10,000,000. A Global Jackpot Leaderboard may be introduced, having a value of twenty percent (20%) of the jackpot prize pool. The main prize would reduce to $8,000,000 and a new Global Jackpot Leaderboard worth $2,000,000 may start operating. Alternatively, the main prize pool could be split into two separate pools, being an $8,000,000 and a $2,000,000 pool. In both examples, players are still able to win all previous bet contributions.

Creating New Progressive Jackpot Prize Pools

A new jackpot prize pool could be started and funded, linked to an existing jackpot prize pool. At the same time, you could introduce bet contribution splitting, with some going to the main pool, and some to the leaderboard pool. In this way, the main jackpot would not be reduced.

Alternatively, a new game may be created which, from a player's point of view, has available a main jackpot and a Jackpot leaderboard from the start. The underlying jackpot could still be shared with an existing game.

For example, Game A is an existing, operational game, known by players. Everyone in Game A sees the potential win on this game as $10,000,000. Game B is a new game. The players see this game as a main prize of $4,000,000, and a leaderboard prize pool amount of $6,000,000. If a player wins in Game B, players in Game A sees the full amount as being won, as expected. If a player in Game A wins, then players in Game B would not get paid according to their leaderboard positions, and they would be notified that the win came from Game A.

II. Example Architecture

Particular implementations are described herein with reference to the drawings. In the description, common features may be designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, players are illustrated and associated with reference number 190. When referring to a particular one of the players, such as the player 190A, the distinguishing letter "A" is used. However, when referring to any arbitrary one of the players or to the players as a group, the reference number 190 may be used without a distinguishing letter.

FIG. 1 is a diagram of a system 100 in accordance with the example embodiments. The system 100 includes server 102 and a plurality of a player devices 192. The server 102 can be communicatively coupled to each player device 192 via one or more networks, such as the network 180. The devices 192 can be used to play a computer-implemented game. For example, the devices 192 can be used to play any online game in which a wager is placed, such as online blackjack, online roulette, online poker, a reel-based slots game, etc.

In FIG. 1, five player devices 192 are depicted. For example, the system 100 includes a player device 192A, a player device 192B, a player device 192C, a player device 192D, and a player device 192E. Although five player devices 192 are depicted, in other implementations, the system 100 can include additional (or fewer) player devices. As a non-limiting example, in some implementations, the system 100 can include thousands of different player devices. As used herein, the player devices 192 can include mobile phones, tablets, laptop computers, desktop computers, personal digital assistants (PDAs), or any other electronic device that is capable of connecting to a remote server, such as the server 102, to support online gaming.

In FIG. 1, a different player 190 of a computer-implemented game is associated with each player device 192. For example, a player 190A is associated with the player device 192A, a player 190B is associated with the player device 192B, a player 190C is associated with the player device 192C, a player 190D is associated with the player device 192D, and a player 190E is associated with the player device 192D. Although illustrated as being associated with different player devices 192, each player 192 is associated with a different account. Thus, in some scenarios, two or more players 190 can use the same player device 192 to play the computer-implemented game. For example, in some scenarios, the player 190A and the player 190B can use the player device 192A to play the computer-implemented game. In these scenarios, each player 190A, 190B can log into different accounts using the player device 192A to play the computer-implemented game.

In some implementations, players 190 can be located in different areas of the world. As a non-limiting example, the player 190A can be located in the United States of America (USA), the player 190B can be located in Japan, the player 190C can be located in France, the player 190D can be located in South Africa, and the player 190E can be located in Brazil. Generally, when the players 190 are located in different areas of the world, the players 190 are eligible to qualify for a leaderboard 144 associated with the computer-implemented game that spans all possible players (e.g., a Global Level Leaderboard). In other implementations, two or more of the players 190 can be located in a relatively close proximity. As a non-limiting example, the player 190A and the player 190B can be located in New York City, New York, USA. Generally, when the players 190A, 190B are located in close proximity, the players 190A, 190B are in the same "market" and are eligible to quality for a leaderboard 144 associated with the computer-implemented game that spans players with the same market (e.g., a Market Level Leaderboard). In some implementations, two more of the players 190D, 190E can play in a computer-implemented game hosted by a particular brand/operator. Generally, when the players 190D, 190E play in a computer-implemented game hosted by a particular brand/operator, the players 190D, 190E are eligible to quality for a leaderboard 144 associated with that particular brand/operator (e.g., a Brand Level Leaderboard).

The server 102 includes a memory 104, a transceiver 106, and a processor 110. The memory 104 can be a non-transitory computer-readable medium that includes instructions 105 that are executable by the processor 110 to perform the operations described herein. The server 102 can be configured to host the computer-implemented game. The server 102 can use the one or more networks 180 to enable different players 190 to participate in (e.g., play) the computer-implemented game from remote player devices 192. For example, the transceiver 106 of the server 102 can send data to the different player devices 192, via the one or more networks 180, to enable the players 190 to play the computer-implemented game, and the transceiver 106 can receive data from the different player devices 192.

The processor 110 includes a computer-implemented game result generator 120, a jackpot determination unit 122, a player profile unit 124, a wager processing unit 126, a leaderboard generation unit 128, a jackpot prize pool control unit 130, and a leaderboard prize allocation unit 132. In some implementations, one or more components 120-132 of the processor 110 can be implemented using dedicated hardware circuitry. As a non-limiting example, in some implementations, one or more components 120-132 of the processor 110 can be implemented using an application-specific integrated circuit (ASIC) or a field-programmable gate array (FPGA) device. In some implementations, one or more components 120-132 of the processor 110 can be implemented using software. As a non-limiting example, functions associated with one or more components 120-132 of the processor 110 can be implemented by the processor 110 executing the instructions 105 stored at the memory 104. As described below, the processor 110 can be used to allocate a portion of a jackpot prize pool 150 among multiple players 190 to increase the amount of jackpot beneficiaries.

In FIG. 1, each player 190A-190E can use the one or more networks 180 and their respective player device 192A-192E to communicate with the server 102 to play the computer-implemented game. For ease of explanation and description, unless otherwise noted, the computer-implemented game will be described as a game where the players 190 spin a wheel to potentially have a winning game result 140 (i.e., online roulette). However, it should be understood that the jackpot allocation techniques described herein are applicable to any online games and the online roulette example should not be construed as limiting.

The player profile unit 124 can generate and maintain a profile of each player 192A-192E that plays the computer-implemented game. For example, for the player account associated with the player 190A, the player profile unit 124 can track how many points the player 190A has acquired while playing the computer-implemented game, how many wagers the player 190A bet on the computer-implemented game, the total amount the player 190A has wagered on the computer-implemented game, how frequent the player 190A plays the computer-implemented game, other player statistics, etc. For the player accounts associated with the other players 190B-190E, the player profile unit 124 can generate and maintain a corresponding profile with similar statistics.

Each time that a player 190 places a wager on the computer-implemented game, the wager processing unit 126 can be configured to update the player account of the player 190 to reflect the wager. Thus, if the points for acquired by each player 190 is based on the amount of wagers placed by the player 190, the wager processing unit 126 can be used to update the points acquired by each player.

Based on the player statistics maintained by the player profile unit 124, the leaderboard generation unit 128 can be configured to generate a leaderboard 144 for the computer-implemented game. The leaderboard 144 includes a list of players 190 that are ranked according to points acquired by each player 190. For ease of illustration and description, let's assume that the player 190A has acquired more points than the player 190B, the player 190B has acquired more points than the player 190C, the player 190C has acquired more points than the player 190D, and the player 190D has acquired more points than any other player (e.g., the player 190E and all other players of the computer-implemented game not depicted in FIG. 1). In this scenario, the player 190A is the first-ranked player on the leaderboard 144, the player 190B is the second-ranked player on the leaderboard 144, the player 190C is the third-ranked player on the leaderboard 144, and the player 190D is the fourth-ranked player on the leaderboard 144.

In some implementations, the points acquired by each player 190A-190D in the list of players 190A-190D can be based on wager amounts from each player 190A-190D during the computer-implemented game. For example, if the player 190A wagered more money than the player 190B, the player 190A may acquire more points than the player 190B. In some implementations, the points acquired by each player 190A-190D in the list of players 190A-190D can be based on random multipliers applied to wager amounts from the players 190A-190D during the computer-implemented game. For example, a random multiplier may be applied during gameplay, so that a player 190 is able to receive more points than normal. If, for example, a 100× point-specific multiplier is activated during a game iteration (e.g., a spin of a wheel) with a $0.10 wager, the player 190 may receive one-hundred (100) points instead of the normal one (1) point. In some implementations, the points acquired by each player 190A-190D in the list of players 190A-190D can be increased in response to the players 190A-190D placing a wager after experiencing consecutive losing wagers. For example, if a player 190 has three losing spins in a row (i.e., the player 190 does not win any return for three rounds of gameplay), the player 190 may be offered double their points on the next wager they place on the game. After five consecutive losing spins, the player 190 may be offered triple their points. After seven consecutive losing spins, the player 190 may be offered quadruple their points, etc. In some implementations, the points acquired by each player 190A-190D in the list of players 190A-190D can be based on an account usage rate of the players 190A-190D.

Although the example of FIG. 1 only depicts four players 190A-190D on the leaderboard 144, in other examples, the leaderboard 144 can include additional players 190. For example, in some implementations, the leaderboard 144 can include thousands of players 190 ranked from highest to lowest. The leaderboard 144 can be a Global Level Leaderboard, a Market Level Leaderboard, or a Brand Level Leaderboard. Unless stated otherwise, for ease of description and illustration, let's assume the leaderboard 144 is a Global Level Leaderboard in which all players 190 of the computer-implemented game are eligible to qualify.

As wagers are placed on the computer-implemented game, the jackpot prize pool control unit 130 can be configured to add a portion of the wager to the jackpot prize pool 150. Thus, the jackpot prize pool 150 is a progressive prize pool that increases as more and more wagers are placed. The jackpot prize pool 150 can include a trigger portion 152 and a leaderboard portion 154. As described below, the trigger portion 152 of the jackpot prize pool 150 can be allocated to a player 190 that triggers the jackpot associated with the computer-implemented game. The leaderboard portion 154 of the jackpot prize pool 150 can be allocated among players 190A-190D on the leaderboard 144 based on the ranking of each player 190. As a non-limiting example, the player 190A can receive a larger portion of the leaderboard portion 154 of the jackpot prize pool 150 than the player 190B because the player 190A is ranked higher on the leaderboard 144 than the player 190B. Similarly, the player 190B can receive a larger portion of the leaderboard portion 154 of the jackpot prize pool 150 than the player 190C because the player 190B is ranked higher on the leaderboard 144 than the player 190C, etc.

For simplicity of description, let's assume that the player 190E completes an iteration of the computer-implemented game (e.g., spins the roulette wheel) and triggers the jackpot while the players 190A-190D are on the leaderboard. As described below, as a result of the player 190E triggering the jackpot, the processor 110 can be used to allocate a portion of a jackpot prize pool 150 among players 190 on the leaderboard 144 to increase the amount of jackpot beneficiaries.

To illustrate, when the player 190E completes the iteration of the computer-implemented game, the computer-implemented game result generator 120 can be configured to generate a game result 140 for the player 190E. The game result 140 can indicate whether the player 190E won, in which case the player's 190E wager is multiplied and returned back to the player 190E. The jackpot determination unit 122 can be configured to determine a jackpot result 142 based on the iteration of the computer-implemented game. For example, the jackpot determination unit 122 can be configured to determine that the player 190E triggered the jackpot associated with the computer-implemented game.

In response to a determination that the player 190E triggered the jackpot, the processor 110 can be configured to allocate the trigger portion 152 of the jackpot prize pool 150 to the player 190E. The processor 110 can also be configured to allocate, based on the ranking of each player 190A-190D in the list of player 190A-190D on the leaderboard 144, the leaderboard portion 154 of the jackpot prize pool 150 among the players 190A-190D in the list of players 190A-190D on the leaderboard 144. For example, the leaderboard prize allocation unit 132 can be configured to allocate a prize amount 160A to the player 190A, a prize amount 160B to the player 190B, a prize amount 160C to the player 190C, and a prize amount 160D to the player 190D.

After the player 190E triggered the jackpot, the processor 110 can be configured to notify the player 190E that the player 190E has triggered the jackpot and has won the trigger portion 152 of the jackpot prize pool 150. For example, the processor 110 can generate an indication, such as a message, an animation to be displayed on the player device 192E, etc., that the player 190E has triggered the jackpot and has won the trigger portion 152 of the jackpot prize pool 150. The transceiver 106 can send the indication to the player device 192E via the one or more networks 180 to notify the player 190E. Additionally, the processor 110 can credit the player's 190E account with the trigger portion 152 of the jackpot prize pool 150.

Additionally, after the player 190E triggered the jackpot, the processor 110 can be configured to notify each player 190A-190D in the list of players 190A-190D on the leaderboard 144 that the jackpot was triggered. For example, the processor 110 can generate an indication, such as a message, an animation to be displayed on the player devices 192A-192D, etc., that the jackpot has been triggered. The transceiver 106 can send the indications to the player devices 192A-192D via the one or more networks 180 to notify the players 190A-190D.

In additional to notifying the players 190A-190D that the jackpot was triggered, the processor 110 can be configured to notify each player 190A-190D in the list of players 190A-190D on the leaderboard 144 of the prize amount 160A-160D awarded. For example, the processor 110 can be configured to notify the player 190A of the prize amount 160A awarded to the player 190A. The prize amount 160A can be based on the leaderboard portion 154 of the jackpot prize pool 150 and the ranking of the player 190A on the leaderboard 144. The processor 110 can also be configured to notify the player 190B of the prize amount 160B awarded to the player 190B. The prize amount 160B can be based on the leaderboard portion 154 of the jackpot prize pool 150 and the ranking of the player 190B on the leaderboard 144. The processor 110 can also be configured to notify the player 190C of the prize amount 160C awarded to the player 190C. The prize amount 160C can be based on the leaderboard portion 154 of the jackpot prize pool 150 and the ranking of the player 190C on the leaderboard 144. The processor 110 can also be configured to notify the player 190D of the prize amount 160D awarded to the player 190D. The prize amount 160D can be based on the leaderboard portion 154 of the jackpot prize pool 150 and the ranking of the player 190D on the leaderboard 144. Additionally, the processor 110 can credit each player's 190A-190D account with the corresponding prize amount 160A-160D.

In some implementations, to increase excitement, prior to the player 190E triggering the jackpot, the processor 110 can be configured to notify each player 190A-190D in the list of players 190A-190D on the leaderboard 144 of their potential winnings if the jackpot is triggered. For example, each player 190A-190D can be alerted of their respective prize amount 160A-160D they stand to win if the jackpot is triggered.

Although the leaderboard portion 154 of the jackpot prize pool 150 is described as being allocated among the players 190A-190D on the leaderboard 144 in response to a player 190 triggering the jackpot, in some implementations, the leaderboard portion 154 of the jackpot prize pool 150 can be allocated among the players 190A-190D when other criteria are met. As a non-limiting example, the leaderboard portion 154 of the jackpot prize pool 150 can be allocated among the list of players 190A-190D included on the leaderboard 144 in response to the top player 190A on the list of players 190A-190D having a point total that satisfies a threshold point total. As another non-limiting example, the leaderboard portion 154 of the jackpot prize pool 150 can be allocated among the list of players 190A-190D included on the leaderboard 144 in response to at least a particular number of players 190 on the list of players 190A-190D having a point total that satisfies a threshold point total. To illustrate, if the top two players have point totals that are above the threshold point total, the leaderboard portion 154 of the jackpot prize pool 150 can be allocated among the list of players 190A-190D. As another non-limiting example, the leaderboard portion 154 of the jackpot prize pool 150 can be allocated among the list of players 190A-190D included on the leaderboard 144 in response to a sum of the points acquired by each player 190A-190D on the list of players 190A-190D satisfying a threshold point total.

By allocating a portion (e.g., the leaderboard portion 154) of the jackpot prize pool 150 to players 190A-190D on the leaderboard 144, the system 100 of FIG. 1 provides a mechanism to increase player enjoyment. For example, instead of the player 190E that triggered the jackpot receiving the entire jackpot prize pool 150, the system 100 enables other players 190A-190D to receive a portion of the jackpot prize pool 150 based on points acquired while the progressive prize pool 150 was increasing. Thus, the techniques implemented by the system 100 also encourages players 190 to participate in the computer-implemented game so that they may acquire enough points to be on the leaderboard 144 when the jackpot is triggered.

Additionally, the system 100 does not have the drawbacks of community jackpots, in that a leaderboard 144 would allow people to climb the leaderboard 144 in multiple time zones. A time limit to contributions may thus not be as problematic. This may allow for greater contributions, and thus a potential greater return, for participants on a leaderboard. Players 190 are rewarded for participation, in addition to having access to a main, large jackpot prize. Leaderboards could be linked to a particular game, a provider, a jurisdiction, or on a global level.

III. Example Prize Pool Allocations to Leaderboard Players

Figure 2:
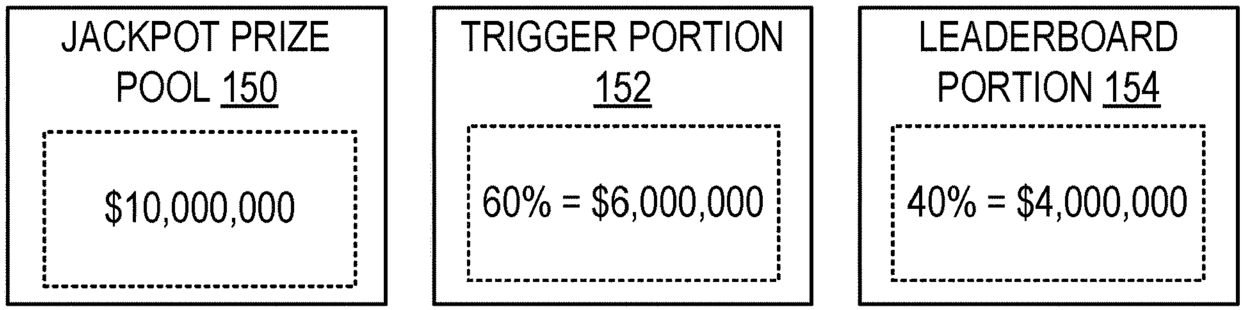
FIG. 2 is a table illustrating an example prize pool allocation to players on a leaderboard in accordance with the example embodiments.

FIG. 2 depicts a table 200 illustrating an example prize pool allocation to players on a leaderboard in accordance with the example embodiments.

In the example of FIG. 2, the jackpot prize pool 150 is equal to $10,000,000. According to the rules of allocating the portions of the prize pool, the trigger portion 152 is sixty percent (60%) of the jackpot prize pool 150 (i.e., $6,000,000), and the leaderboard portion 154 is forty percent (40%) of the jackpot prize pool 150 (i.e., $4,000,000). During gameplay, all players 190 may be shown the trigger portion 152. In some scenarios, the leaderboard portion 154 can also be shown to the players 190. The leaderboard prizes can be displayed as a total value or as a "per player" value. When a player 190 triggers the jackpot, being $6,000,000 in this instance, all other players 190 in winning positions on the leaderboard 144 may receive a predetermined share of the leaderboard prize, being $4,000,000 in this example.

In some scenarios, there may be multiple prize levels on the leaderboard 144. As a non-limiting example, one-thousand (1000) players can be included on the leaderboard 144, and the leaderboard 144 can have three prize levels, with Prize Level One (1) being the highest level and Prize Level Three (3) being the lowest prize level. In one implementation, the fifty (50) highest ranked players 190 are associated with Prize Level One (1), the next two-hundred (200) highest ranked players 190 are associated with Prize Level Two (2), and the last seven-hundred and fifty (750) highest ranked players 190 are associated with Prize Level Three (3). If the jackpot is triggered, the fifty (50) players 190 associated with Prize Level One (1) can collectively share twenty percent (20%) of the jackpot prize pool 150 (e.g., $800,000), or $16,000 for each player 190. The two-hundred (200) players 190 associated with Prize Level Two (2) can collectively share thirty percent (30%) of the jackpot prize pool 150 (e.g., $1,200,000), or $6,000 for each player 190. The seven-hundred and fifty (750) players 190 associated with Prize Level Three (3) can collectively share fifty percent (50%) of the jackpot prize pool 150 (e.g., $2,000,000), or $2,666 for each player 190. In this example there are only three prize levels and one-thousand (1000) prizes available according to leaderboard positions. In some implementations, the number of prize levels and the number of prizes can be configurable, so that any desired configuration can be provided.

In some scenarios, the winner of the trigger portion 152 may be eligible for their share of the leaderboard portion. If, in the above example, the one-hundredth highest ranked player 190 triggers the jackpot, they may receive $6,000 in addition to their trigger portion of $6,000,000. This may, again, can be configurable for a particular desired application.

FIG. 3 depicts another table 300 illustrating an example prize pool allocation to players on a leaderboard in accordance with the example embodiments.

In FIG. 3, let's assume that three different computer-implemented games (e.g., Game A, Game B, and Game C) share the same jackpot prize pool 150 of $10,000,000. Game A may not have a leaderboard 144 and may be a traditional progressive jackpot game. All players 190 in Game A will see a prize worth $10,000,000. If a player 190 in Game A wins the jackpot, such player 190 will win the full prize. Game B may have a Global Level Leaderboard, which accounts for sixty percent (60%) of the jackpot prize pool 150. In Game B, the players 190 will see a jackpot prize (e.g., a trigger portion 152) worth $4,000,000 and a jackpot leaderboard prize pool (e.g., a leaderboard portion 154) worth $6,000,000. Since this is a Global Level Leaderboard, every player 190 playing in Game B will see a Global Level Leaderboard. If a player 190 in Game B wins the jackpot, such player 190 will win forty percent (40%) of the jackpot prize pool 150, while the remaining sixty percent (60%) of the jackpot prize pool 150 will be allocated among the players 190 on the Global Level Leaderboard. Game C may have a Market Level Leaderboard, which accounts for twenty-five percent (25%) of the jackpot prize pool 150. In Game C, the players 190 will see a jackpot prize (e.g., a trigger portion 152) worth $7,500,000 and a leaderboard prize pool (e.g., a leaderboard portion 154) of $2,500,000. Since this is a Market Level Leaderboard, only players 190 playing in the specific market (for example, only in the USA, in a particular state in the USA, or the like) will see this Market Level Leaderboard. It may be possible that players 190 who are not part of the specific market could see and take part on a Global Level Leaderboard. Game C can also have a Brand Level Leaderboard which applies to a specific operator brand. This Brand Level Leaderboard can be worth seventy-five percent (75%) of the jackpot prize pool 150. In this game, the players 190 who are utilizing the services of the particular brand would see a jackpot prize (e.g., a trigger portion 152) worth $2,500,000 and a jackpot leaderboard prize pool (e.g., a leaderboard portion 154) worth $7,500,000.

In the above examples, it should be noted that Games A, B and C all play for the same jackpot prize pool 150, and the allocation of winnings are determined by the playing characteristics of the player 190 triggering the jackpot. A particular game can have no jackpot leaderboard or multiple levels of configuration. In the above example, Game C has both a Market Level Leaderboard and a Brand Level Leaderboard. The particular player 190 winning the jackpot may determine the allocation of the winnings.

Thus, in the above examples, if a player 190 in Game A wins the jackpot, no leaderboard payouts will be applicable. If a player 190 in Game B wins the jackpot, Game B's leaderboard players would share sixty percent (60%) of the jackpot prize pool 150, while the players 190 on the leaderboard of Game C would not receive anything. If a player 190 in Game C wins the jackpot, and that player 190 was participating in the Market Level Leaderboard, then all those players 190 on the Market Level Leaderboard would win a share of the winnings. If the winning player 190 was participating in the Brand Level Leaderboard, then all those players 190 on the Brand Level Leaderboard 144 would receive a share of the winnings prize.

A Brand Level Leaderboard may override or take preference over a relevant Market Level Leaderboard, i.e. if a player 190 in a particular market plays Game C with a particular operator, the configuration of the operator may override the configuration of the particular marketplace. A particular operator may thus have their own leaderboard, and if any one of their players wins the jackpot, their own players may share in the winnings.

In some embodiments, a player may be allowed to choose which leaderboard they wish to take part in if more than one leaderboard may be applicable to them. While a user's likelihood of triggering the jackpot themselves will remain the same for any player, the player's chance of receiving a share of any triggered jackpot may change based on the leaderboard they take part in. A particular operator may have a one-thousand (1000) person leaderboard, while another may have a one-hundred (100) person leaderboard. In addition, the more players in a particular market (for a Market Level Leaderboard) or with a particular operator (for a Brand Level Leaderboard), the greater the possibility that one of the players taking part in the same leaderboard may trigger the particular jackpot, leading to a share of the winnings between all players on the particular leaderboard.

FIG. 4 depicts another table 400 illustrating an example prize pool allocation to players on a leaderboard in accordance with the example embodiments.

In FIG. 4, there may be two different prize pools, one for the jackpot prize, and one for the leaderboard prizes. With two separate pools, configuration of the system 100 would be more complex, but would allow for greater control over winning allocation.

One example may be a jackpot prize pool of $9,000,000, and a leaderboard prize pool of $1,000,000. If a player 190 in Game A wins the main jackpot prize, there will not be a winner on the Global Level Leaderboard. The main jackpot prize would reset back to its starting amount, and the jackpot leaderboard will continue from its current $1,000,000.

FIG. 5 depicts another table 500 illustrating an example prize pool allocation to players on a leaderboard in accordance with the example embodiments.

In FIG. 5, the techniques described with respect to FIG. 4 can also be applied to a Market Level Leaderboard or a Brand Level Leaderboard. For example, players 190 taking part in Game B's Global Level Leaderboard can win its leaderboard amount, and players 190 taking part in Game B's Market Level Leaderboard can win its leaderboard amount (depending on which player 190 triggers the jackpot and wins the main prize). Since the jackpot prize amount and the leaderboard prize amount is separated, players 190 can take part in both the Global and the Market Level Leaderboards at the same time. So, if a player 190 plays in Game B, and takes part in both leaderboards, they can win the main jackpot and trigger payouts of both leaderboards, to be paid from the relevant prize pool. If a player 190 that does not take part in the Market Level Leaderboard, but only in the Global Level Leaderboard, wins the jackpot prize, only the Global Level Leaderboard will pay out, and not the Market Level Leaderboard. The market prize pool may then remain at that particular level, while the global prize pool may reset.

FIG. 6 depicts another table 600 illustrating an example prize pool allocation to players on a leaderboard in accordance with the example embodiments.

In FIG. 6, the techniques described with respect to FIGS. 4-5 can also be extended to a brand level. For example, a Brand Level Leaderboard may be localized to the players 190 in the operator's brand. It will only be won when a player 190 from the operator's brand wins the main jackpot prize. This would naturally be a smaller group of players 190 on the jackpot leaderboard and create a unique offering for the operator's brand. Players 190 in this brand who are also in the specific market would then be participating in three jackpot leaderboards i.e. Global, Market and Brand.

IV. Examples of Building Progressive Jackpots

FIG. 7 depicts a table 700 illustrating an example of building a progressive jackpot in accordance with the example embodiments.

In FIG. 7, while the main jackpot prize pool is worth less than $10,000,000, the jackpot prize pool contributions can be split 50-50. Once the main jackpot prize pool 150 exceeds $10,000,000, the prize pool contributions can be split 10-90, with the leaderboard jackpot pool (e.g., the leaderboard portion 154) increasing at a faster rate than the main jackpot prize pool 150.

V. Examples of Merging Different Jackpot Games

FIG. 8 depicts a table 800 illustrating an example of merging a new progressive game that allocates a progressive jackpot with leaderboard players with an existing progressive jackpot game in accordance with the example embodiments.

In FIG. 8, Game A is an existing, operational game, known by players. Everyone in Game A sees the potential win on this game as $10,000,000. Game B is a new game. The players see this game as a main prize of $4,000,000, and a leaderboard prize pool amount of $6,000,000. If a player wins in Game B, players in Game A sees the full amount as being won, as expected. If a player in Game A wins, then players in Game B would not get paid according to their leaderboard positions, and they would be notified that the win came from Game A.

VI. Example System

Figure 9:
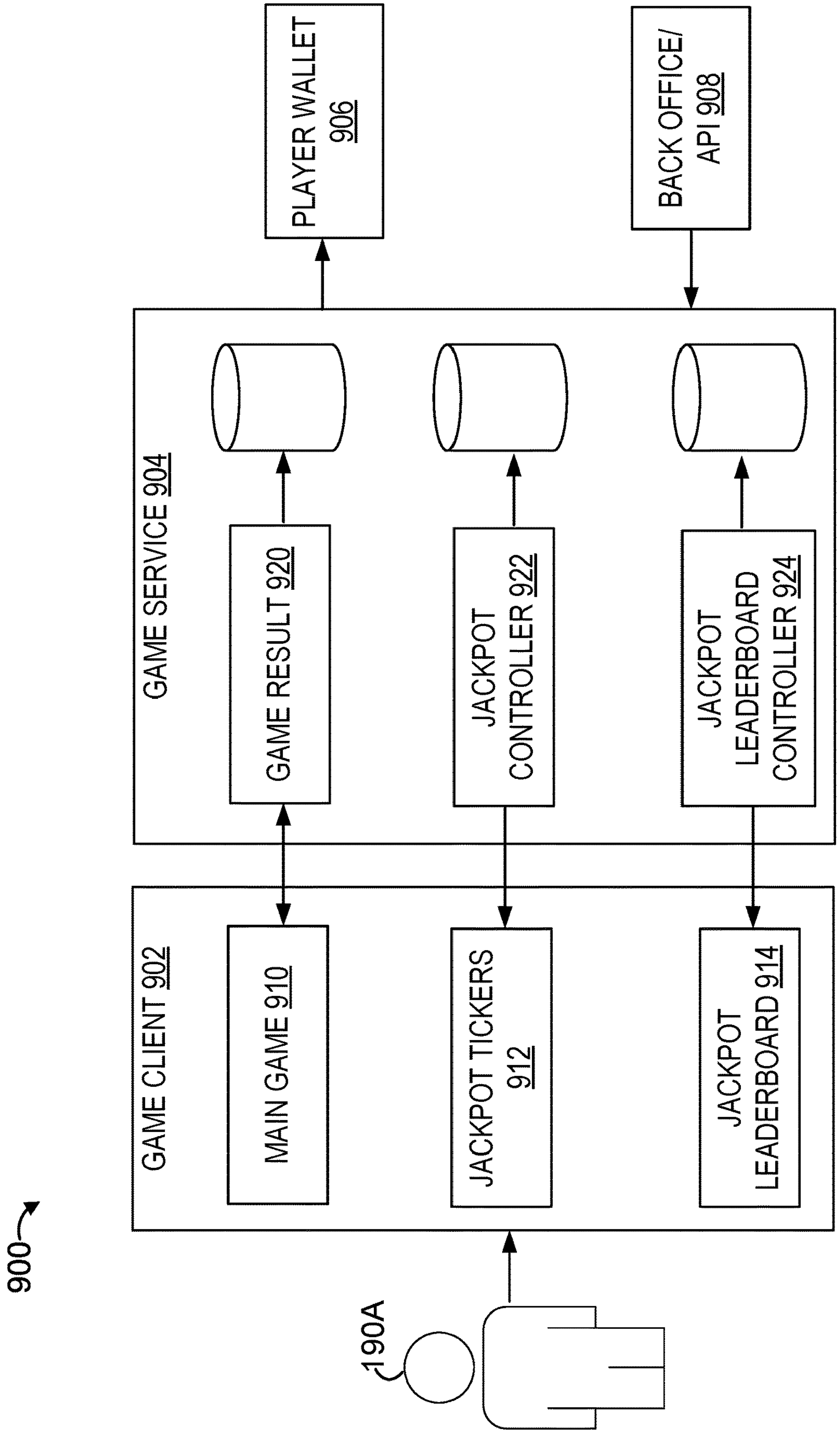
FIG. 9 is another block diagram of a system in accordance with the example embodiments.

FIG. 9 is a diagram of a system 900 in accordance with the example embodiments. The system 900 includes a game client 902, a game service 904, a player wallet 906, and a back office 908 (e.g., an application programming interface (API)).

In FIG. 9, the player 190A correspond to an end user that is currently playing the computer-implemented game or who has previously played the computer-implemented game. The player 190A may be online or offline. The jackpot leaderboard prizes may be awarded to players 190 who are not online at the time the jackpot is triggered.

The game client 902 is the game the player 190A will see. For example, the game client 902 can be displayed by the player device 192A. The game client 902 can be displayed using a web browser or via a mobile application. The game client includes visual elements, such as a main game 910, a jackpot tickers 912, and the jackpot leaderboard 914. The visual elements 910, 912, 914 interact with each other through APIs. The main game 910 is any game which is eligible to participate in the jackpot. The jackpot tickers 912 include the visual elements shown in the game client 902 which shows the player 190A the current value of the jackpot prizes. The jackpot tickers 912 may be animated with the numbers rolling upwards. When a player 190 wins the jackpot, the jackpot tickers 912 update and reset back to the new jackpot value. The jackpot leaderboard 914 is the visual aspect shown in the game client 902 which shows a relevant leaderboard for the player 190A and the game they are playing in, or for the leaderboard requested by the game client 902. In some implementations, the jackpot leaderboard 914 can correspond to the leaderboard 144.

The game service 904 is a collection of services required to process the computer-implemented game. The game service 904 includes components, such as a game result 920, a jackpot controller 922, and a jackpot leaderboard controller 924. Each component 920, 922, 924 will have its own data storage. The components 920, 922, 924 they interact with each other through APIs. The game result 920 is the main service component which will use a random number generator (RNG) to generate a game result for the computer-implemented game. The game result 920 will communicate with the jackpot controller 922 when there is an active jackpot on the computer-implemented game. The jackpot controller 922 is the service which will track all jackpot contributions and wins. On jackpot wins, jackpot controller 922 resets the jackpot values. The jackpot controller 922 stores all the jackpot odds for winning and all other jackpot configurations. The jackpot leaderboard controller 924 is the service that will track all players' 190 positions in a leaderboard, as well as the associated prizes. The jackpot leaderboard controller 924 will also facilitate paying of players when they win. Further, the jackpot leaderboard controller 924 is responsible for the independent trigger conditions and tracking (if applicable). In essence, this service will be responsible for a large set of functionality that is not currently provided by or allowed by known normal Jackpot controllers.

The player wallet 906 is the element which has the player's 190A account and wallet. To debit or credit the player wallet 906, a call is made to this service.

The back office 908 is the tool that is used to configure and report on the jackpots.

VII. Example Jackpot Controller Operations

FIG. 10 depicts a jackpot configuration table 1000 in accordance with the example embodiments.

A jackpot controller may be configured to allocate bet contributions according to the jackpot leaderboard configuration. Allocation of the bet contributions is a unique type of data that is stored based on the techniques described herein. The jackpot configuration table 1000 depicts different jackpot contributions based on the bet amounts.

In the jackpot configuration table 1000, the jackpot identifier (ID) is the identifier of the specific jackpot that is being played by the player 190. The player ID is a unique identifier for a player 190. The bet amount is the amount stored both in player-based current and jackpot-based currency. The jackpot contribution is the amount that was contributed towards the jackpot prize pool.

FIG. 11 depicts another jackpot configuration table 1100 in accordance with the example embodiments.

In FIG. 11, the jackpot configuration table 1100 includes similar data as the jackpot configuration table 1000 of FIG. 10; however, the jackpot configuration table 1100 also includes jackpot points. The jackpot points are the number of points that a player 190 was allocated for a particular bet (according to the particular rules in place for allocation of points).

The rules in place will define the points allocated for each bet. In the example of FIG. 11, for illustration, the points are unrelated to the bet amount and are being governed by the rules that are not shown. In some scenarios, the rules used when calculating the jackpot points may be stored, further extending the dataset involved.

In above tables 1000, 1100, data such as timestamps, game transaction ID, etc. have been omitted for sake of simplicity. However, tracking this data along with and jackpot points will need to be done in a synchronous way. For example, a jackpot is triggered, a message goes to the jackpot controller to claim the jackpot. The "win" messages are processed in the exact order that they are received by the jackpot controller. If two people are playing a game at the same time, they could be playing via the same or a different game server. All game servers communicate with the jackpot controller. The jackpot controller processes gameplay in the order received. The game server to jackpot controller message determines the winner of a jackpot.

So if two players trigger the jackpot at more-or-less the same time, the first winner of the current jackpot prize would be the player whose win message is received by the jackpot controller first. The player whose message is received second at the jackpot controller will win a second, possibly smaller, jackpot prize. Whoever's win message arrives at the jackpot controller first gets awarded the prize. Thus, by allocating points at the same time as the bet contribution is made ensures that the player is allocated the correct amount of points when the jackpot is won and the player's points are counted.

When a player wins the jackpot, the jackpot controller may stop all further contributions to the jackpot prize pool and the contributions go into the next jackpot instance. The jackpot controller sums up all the contributions and finalizes the win amount for the player. A rolling summed up value is maintained for fast execution speed. In a similar way that the bet contributions made after the jackpot has been won go into the next jackpot, the same is true for the jackpot points.

FIG. 12 depicts a table 1200 used to generate a jackpot leaderboard in accordance with the example embodiments.

As illustrated in FIG. 12, to calculate a jackpot leaderboard, such as the leaderboard 144, the jackpot leaderboard controller service sums up the points for each player. For example, as illustrated in the table, for the jackpot with the Jackpot ID 178, the player 190 with the Player ID 123 has 10 jackpot points, the player 190 with the Player ID 324 has 776 jackpot points, and the player 190 with the Player ID 456 has 2332 jackpot points.

The jackpot leaderboard controller keeps up-to-date a near-real time view of the leaderboard that is shared with the Game Clients. When a jackpot is won, the leaderboard will be finalized against all the allocated jackpot points and a final position for the leaderboard is established.

In addition to the game service needing the leaderboard data, the game client also requires a set of data for current players to show such current players the jackpot leaderboard. This dataset, which the game service sends to the game client, will be optimized to give the players the jackpot leaderboard information which is relevant to the player. For example, it will need to be the data for the active jackpot the player is looking at and for the leaderboard that the player is interested in.

In some embodiments, the game service may not send all available data to the game client, as it would be of excessive size, much too large to be practical for the end user device to receive and, possibly, filter. Thus, likewise, the game service may send relevant data periodically and must optimize the size of the dataset to ensure maximum performance.

FIG. 13 depicts another jackpot configuration table 1300 in accordance with the example embodiments.

When the jackpot leaderboard can trigger outside of a main jackpot being won (e.g., by a player achieving X number of points, after a predetermined time limit has been reached, etc.), jackpot leaderboard controller logic may trigger based on these pre-set conditions. The jackpot leaderboard controller logic may call the jackpot controller to notify the jackpot controller of this condition.

Thus, as illustrate in the table 1300, jackpot points active shows a True or False, based on if the relevant points are still active and should be used for a jackpot leaderboard. If the trigger has finalized a jackpot leaderboard and paid out to players, the points will be marked as no longer active. These trigger events, managed by the jackpot leaderboard controller, may also be communicated with a game client.

VIII. Example Method

Figure 14:
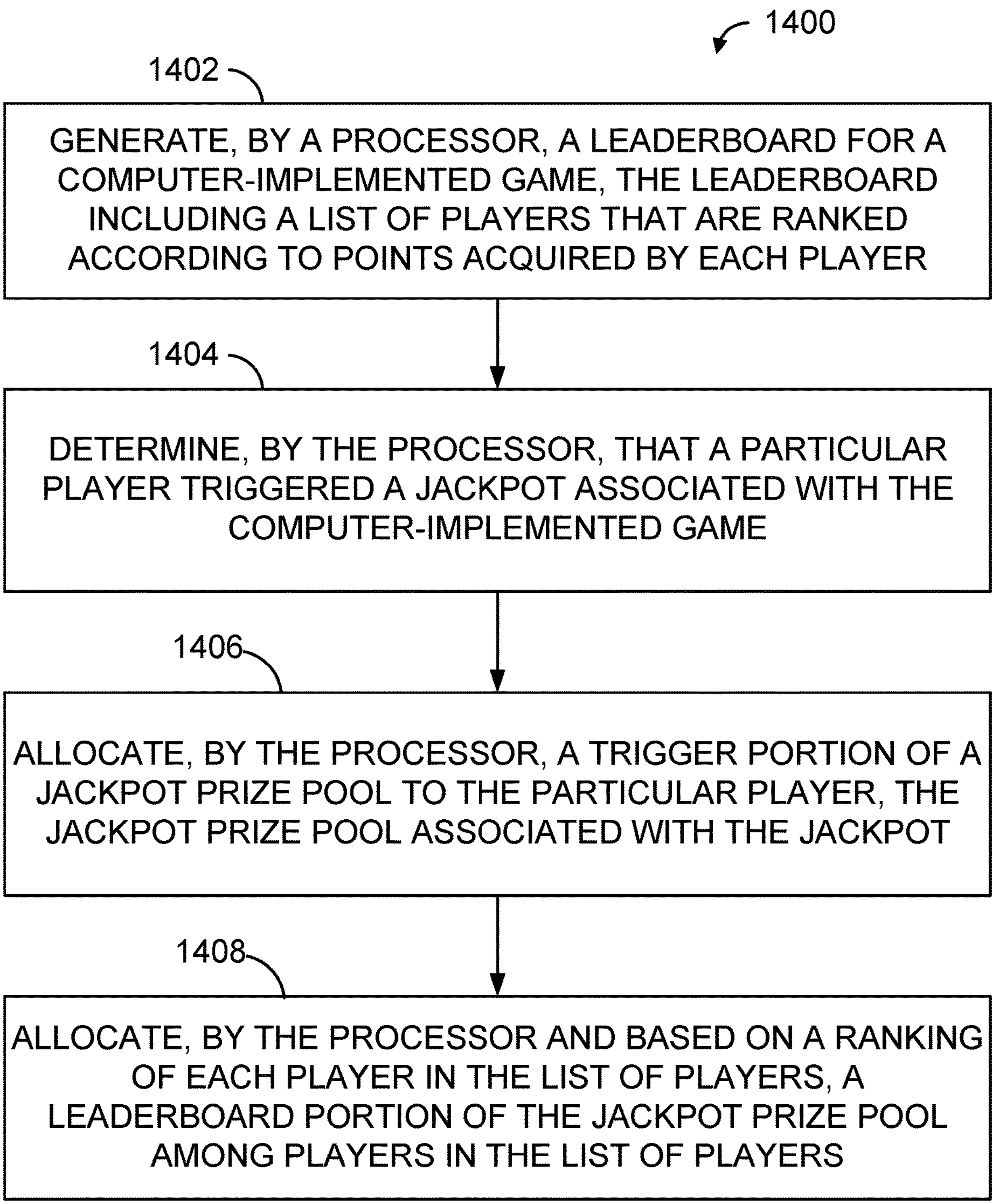
FIG. 14 is a flowchart showing an example method in accordance with the example embodiments.

FIG. 14 illustrates a flowchart showing an example method 1400. The method 1400 can be performed by the server 102 of FIG. 1. In particular, the method 1400 can be performed by the processor 110 of FIG. 1.

The method 1400 includes generating, by a processor, a leaderboard for a computer-implemented game, at block 1402. The leaderboard includes a list of players that are ranked according to points acquired by each player. For example, referring to FIG. 1, the processor 110 generates the leaderboard 144 for the computer-implemented game. The leaderboard 144 includes the list of players 190A-190D that are ranked according to points acquired by each player 190A-190D.

The method 1400 also includes determining, by the processor, that a particular player triggered a jackpot associated with the computer-implemented game, at block 1404. For example, referring to FIG. 1, the processor 110 determines that the player 190E triggered the jackpot associated with the computer-implemented game.

The method 1400 also includes allocating, by the processor, a trigger portion of a jackpot prize pool to the particular player, at block 1406. The jackpot prize pool is associated with the jackpot. For example, referring to FIG. 1, the processor 110 allocates the trigger portion 152 of the jackpot prize pool 150 to the player 190E. The jackpot prize pool 150 is associated with the jackpot.

The method 1400 also includes allocating, by the processor and based on a ranking of each player in the list of players, a leaderboard portion of the jackpot prize pool among players in the list of players, at block 1408. For example, referring to FIG. 1, the processor 110 allocates, based on the ranking of each player 190A-190D in the list of players 190A-190D, the leaderboard portion 154 of the jackpot prize pool 150 among the players 190A-190D in the list of players 190A-190D on the leaderboard 144.

According to one implementation, the method 1400 can also include notifying, by the processor, the particular player that the particular player has triggered the jackpot and has won the trigger portion of the jackpot prize pool. For example, referring to FIG. 1, the processor 110 notifies the player 190E that the player 190E has triggered the jackpot and has won the trigger portion 152 of the jackpot prize pool 150. According to one implementation, the method 1400 can also include notifying, by the processor, each player in the list of players that the jackpot was triggered. For example, referring to FIG. 1, the processor 110 notifies each player 190A-190D in the list of players 190A-190D on the leaderboard 144 that the jackpot was triggered.

According to one implementation, the method 1400 can also include notifying, by the processor, a first player in the list of players of a first prize amount awarded to the first player. The first prize amount is based on the leaderboard portion of the jackpot prize pool and a ranking of the first player on the leaderboard. For example, referring to FIG. 1, the processor 110 notifies the player 190A in the list of players 190A-190D of the prize amount 160A awarded to the player 190A. The prize amount 160A is based on the leaderboard portion 154 of the jackpot prize pool and the ranking of the player 190A on the leaderboard 144. According to one implementation, the method 1400 can also include notifying, by the processor, a second player in the list of players of a second prize amount awarded to the second player. The second prize amount is based on the leaderboard portion of the jackpot prize pool and a ranking of the second player on the leaderboard. For example, referring to FIG. 1, the processor 110 notifies the player 190B in the list of players 190A-190D of the prize amount 160B awarded to the player 190B. The prize amount 160B is based on the leaderboard portion 154 of the jackpot prize pool and the ranking of the player 190B on the leaderboard 144.

According to one implementation, the method 1400 includes notifying, by the processor, each player in the list of players of their potential winnings if the jackpot is triggered prior to the particular player triggering the jackpot. The potential winnings of each player in the list of players is based on the leaderboard portion of the jackpot prize pool and based on a ranking of each player in the list of players. For example, referring to FIG. 1, the processor 110 notifies each player 190A-190D in the list of players 190A-190D of their potential winnings (e.g., the corresponding prize amounts 160A-160D) if the jackpot is triggered prior to the player 190E triggering the jackpot. The potential winnings of each player 190A-190D in the list of players 190A-190D is based on the leaderboard portion 154 of the jackpot prize pool 150 and based on a ranking of each player 190A-190D in the list of players 190A-190D.

According to one implementation of the method 1400, the points acquired by a first player in the list of players are based on wager amounts from the first player during the computer-implemented game. For example, referring to FIG. 1, the points acquired by the player 190A in the list of players 190A-190D are based on wager amounts from the player 190A during the computer-implemented game.

According to one implementation of the method 1400, the points acquired by a first player in the list of players are based on random multipliers applied to wager amounts from the first player during the computer-implemented game. For example, referring to FIG. 1, the points acquired by the player 190A in the list of players 190A-190D are based on random multipliers applied to wager amounts from the player 190A during the computer-implemented game.

According to one implementation of the method 1400, the points acquired by a first player in the list of players are increased in response to the first player placing a wager after experiencing consecutive losing wagers. For example, referring to FIG. 1, the points acquired by the player 190A in the list of players 190A-190D are increased in response to the player 190A placing a wager after experiencing consecutive losing wagers.

According to one implementation of the method 1400, the points acquired by a first player in the list of players are based on an account usage rate of the first player. For example, referring to FIG. 1, the points acquired by the player 190A in the list of players 190A-190D are based on an account usage rate of the player 190A.

According to one implementation of the method 1400, the leaderboard 144 is a global level leaderboard, a market level leaderboard, or a brand level leaderboard. According to one implementation of the method 1400, the jackpot prize pool 150 is a progressive prize pool, and each player 190A-190D in the list of players 190A-190D has contributed to the jackpot prize pool 150.

According to one implementation of the method 1400, the leaderboard portion 154 of the jackpot prize pool 150 is allocated among the list of players 190A-190D included on the leaderboard 144 in response to a top player 190A on the list of players 190A-190D having a point total that satisfies a threshold point total. According to one implementation of the method 1400, the leaderboard portion 154 of the jackpot prize pool 150 is allocated among the list of players 190A-190D included on the leaderboard 144 in response to at least a particular number of players 190 on the list of players 190A-190D having a point total that satisfies a threshold point total. According to one implementation of the method 1400, the leaderboard portion 154 of the jackpot prize pool 150 is allocated among the list of players 190A-190D included on the leaderboard 144 in response to a sum of the points acquired by each player 190A-190D on the list of players satisfying a threshold point total.

According to one implementation of the method 1400, generating the leaderboard includes designating, by the processor, data storage for storing the leaderboard and game result data. The game result data corresponds to performances of a base game and is used to determine changes in the leaderboard during performance of the computer-implemented game. The game result data includes a respective quantity of points acquired for each performance of the base game. Designating the data storage occurs upon completion of a prior performance of the computer-implemented game. Generating the leaderboard also includes writing, by the processor, the respective quantity of points acquired for each performance of the base game contemporaneously with receiving a wager contribution for that performance of the base game.

The method 1400 of FIG. 14 provides a mechanism to increase player enjoyment by allocating a portion (e.g., the leaderboard portion 154) of the jackpot prize pool 150 to players 190A-190D on the leaderboard 144. For example, instead of the player 190E that triggered the jackpot receiving the entire jackpot prize pool 150, the method 1400 enables other players 190A-190D to receive a portion of the jackpot prize pool 150 based on points acquired while the progressive prize pool 150 was increasing. Thus, the method 1400 also encourages players 190 to participate in the computer-implemented game so that they may acquire enough points to be on the leaderboard 144 when the jackpot is triggered.

IX. Additional Example Architectures

Figure 15:
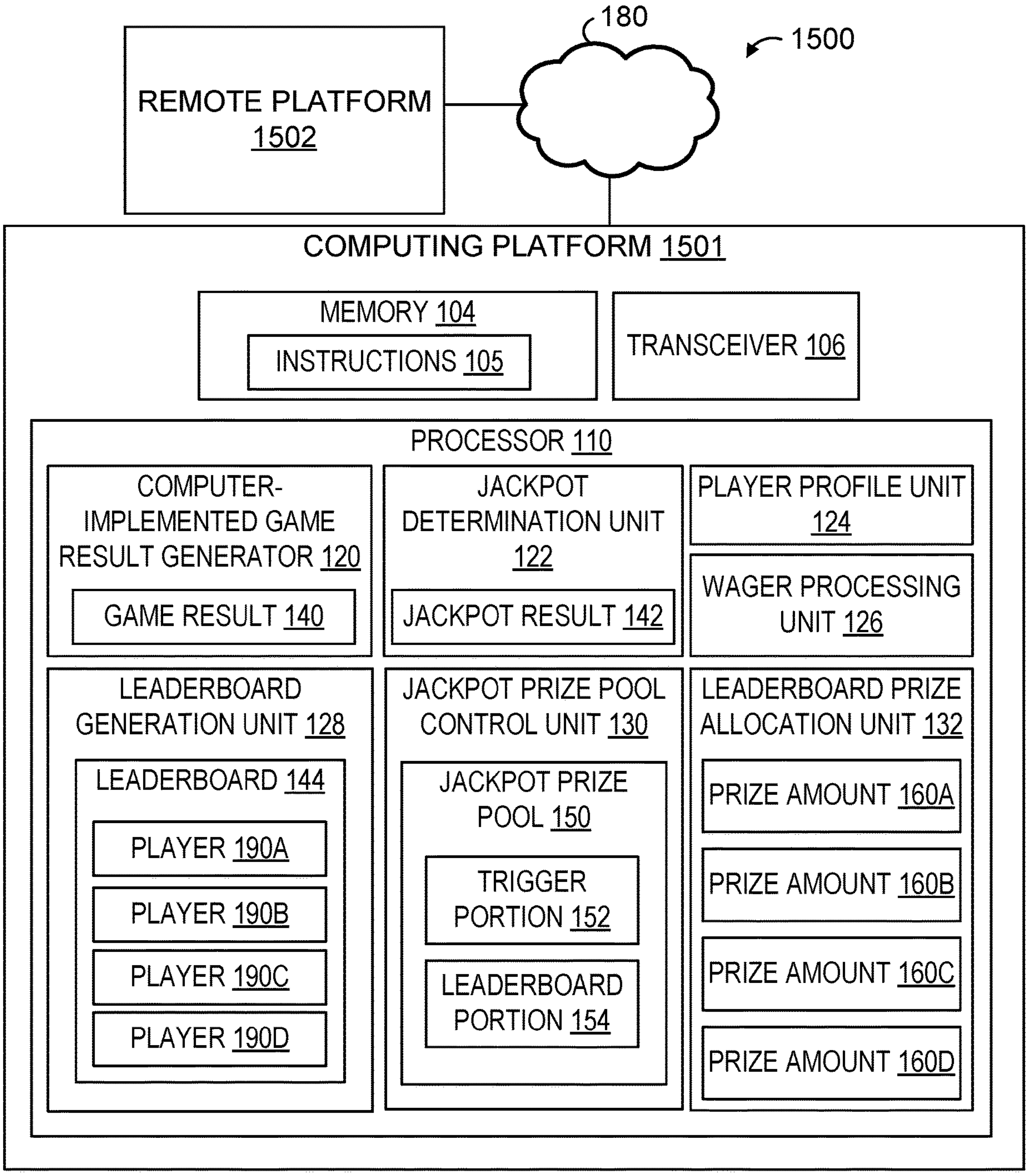
FIG. 15 is a block diagram of a computing system in accordance with the example embodiments.

FIG. 15 is a block diagram of a computing system 1500 configured for allocating the jackpot among players 190 in the leaderboard 144 in accordance with the example embodiments. The computing system 1500 can include a computing platform 1501 (e.g., one or more computing platforms). The computing platform 1501 can be configured to communicate with a remote platform 1502 (e.g., one or more remote platforms) according to a client/server architecture, a peer-to-peer architecture, and/or other architectures. The remote platform 1502 can be configured to communicate with other remote platform(s) via the computing platform 1501 and/or according to a client/server architecture, a peer-to-peer architecture, and/or other architectures via the one or more networks 180. Users can access the computing system 1500 directly or via the remote platform 1502. According to some embodiments, one or more of the computing platform 1501, the remote platform 1502, and/or other components of computing system 1500 can be the same as or similar to one or more components of the server 102. For example, as depicted in FIG. 15, the computing platform 1501 can include the memory 104, the transceiver 106, and the processor 110.

Thus, if the remote platform 1502 corresponds to a user device (e.g., a mobile phone, a tablet, a laptop, a smartphone, etc.), the player can use the remote platform 1502 to play a computer-implemented game hosted by the computing platform 1501. For example, the computing platform 1501 can be a server that communicates with the remote platform 1502 though a wireless connection.

The computing system 1500, the computing platform 1501 and/or the remote platform 1502 can perform one or more functions of the method 1400.

Figure 16:
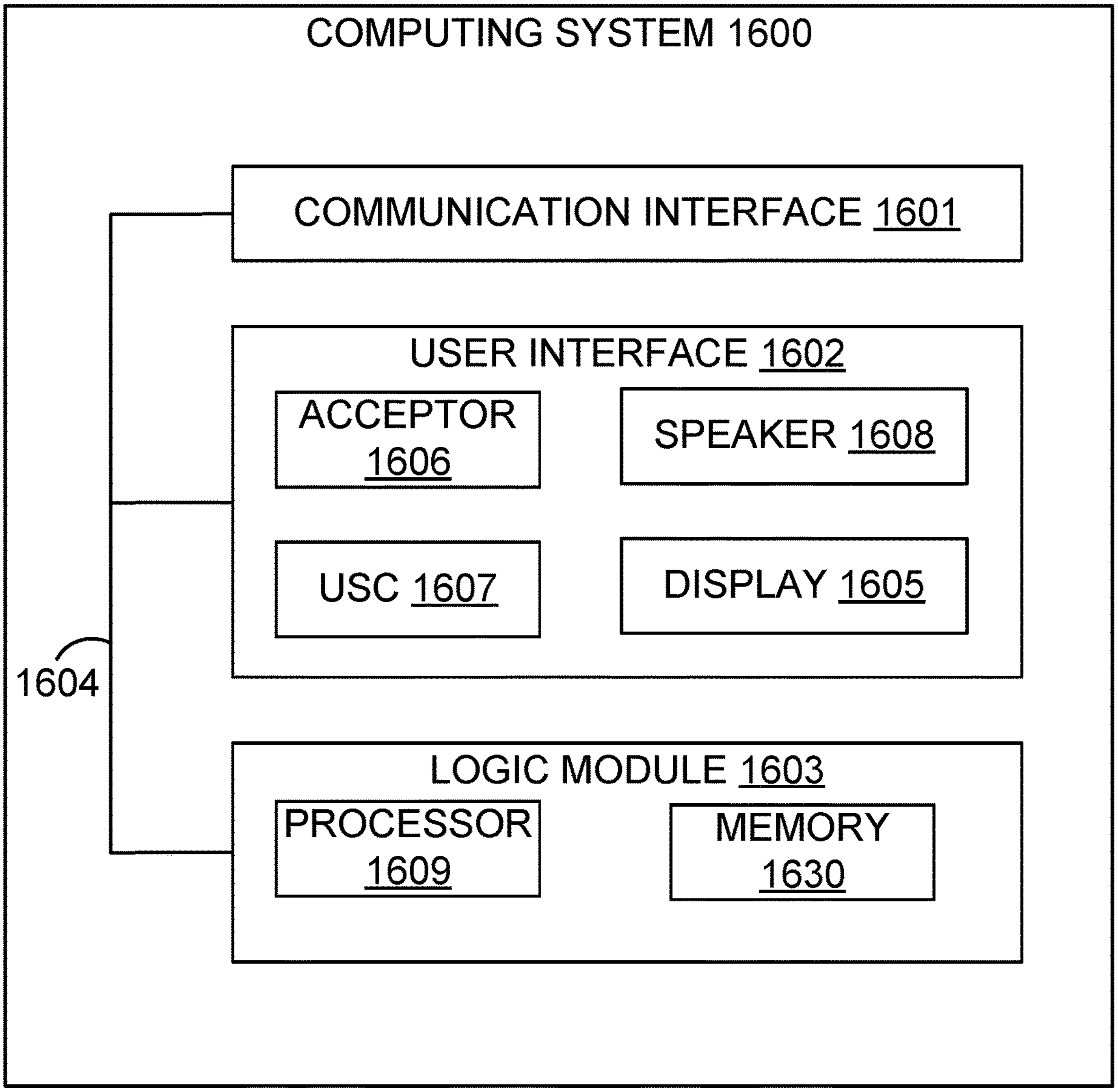
FIG. 16 is a block diagram of a computing system in accordance with the example embodiments.

FIG. 16 is a block diagram of a computing system 1600 in accordance with the example embodiments. The computing system 1600 can be arranged as and/or include a stand-alone computing system, a distributed computing system, a personal computer, a server computing system, a client computing system, a portable computing system, a mobile phone, a smartphone, a tablet device, and/or some other computing device. The computing system 1600 can be referred to as a user device or a player device, such as the player devices 192A-192E.

The computing system 1600 can include a communication interface 1601, a user interface 1602, and a logic module 1603, two or more of which can be coupled together by a connection mechanism 1604 (e.g., a system bus or network). The communication interface 1601 can include a wired or wireless network communication interface. For purposes of this description, any data described as being provided, sent, or transmitted by the computing system 1600 can include data sent by the communication interface 1601 over a communication network. In addition, for purposes of this description, any data described as being received by the computing system 1600 can include data sent to communication interface 1601 over a communication network.

The user interface 1602 includes components that can facilitate interaction with a user of the computing system 1600. For example, the user interface 1602 can include user interface output components, such as a display 1605 and/or a speaker 1608. As another example, the user interface can include user interface input components, such as an acceptor 1606, a user-selectable control 1607 (e.g., a keypad, a keyboard, or a mouse), or a touch-sensitive screen. The touch-sensitive screen can be part of the display 1605, such that the display 1605 is operable as both a user interface input component and a user interface output component. The user-selectable control 1607 can include one or more user-selectable controls, one or more of which can be implemented on the touch sensitive screen (which can also be referred to as a touch pad). The logic module 1603 (e.g., the processor 1609) can be configured to detect selection of a user-selectable control and cause the computing system to perform one or more functions in response to the detected selection.

The speaker 1608 can output sound waves, such as sound waves corresponding to a performance of a computer-implemented game. As an example, the sound waves can represent sound waves produced by a roulette wheel spinning in a casino. As another example, the sound waves can include sounds waves produced by a person speaking or a musical instrument. As another example, the sound waves can include audible sounds corresponding to an animation showing portion(s) of a computer-implemented game performance.

The display 1605 is configured to display (i.e., visually present and/or show) content. As an example, the content can correspond to a performance of a computer-implemented game, such as a spinnable wheel, a wager amount, a previous result, an award, an instruction, and/or a user-selectable control (e.g., a button). As another example, the content can include text, a graphic, a graphical user interface, an animation, a video, or some other content as well or instead. The display 1605 can include a display screen (e.g., a display panel or a graphical display unit) including a quantity of pixels (e.g., 786,432 pixels in an array of pixels that is 1,024 pixels by 768 pixels). Other examples of an array of pixels are possible.

Additionally, the display 1605 and/or the display screen can include and/or be arranged as a liquid crystal display (LCD), a light emitting diode (LED) display, an organic LED (OLED) display, a plasma display or some other type of display. Furthermore, the display 1605 can embody the touch sensitive screen noted above such that the display 1605 and/or display screen includes and/or is arranged as a touch screen display.

The logic module 1603 can include and/or be arranged as a processor 1609 and/or a memory 1630. The processor 1609 can include one or more processors. The processor 1609 can include a general-purpose processor (e.g., a microprocessor) or a special-purpose processor (e.g., a graphics process, a digital signal processor or an application specific integrated circuit) and can be integrated in whole or in part with the communication interface 1601 or the user interface 1602. Any memory discussed in this description or shown in the drawings can be referred to as a computer-readable memory, data storage, computer-readable data storage, among other names.

The memory 1630 can include volatile or non-volatile storage components and can be integrated in whole or in part with the processor 1609. The memory 1630 can take the form of a non-transitory computer-readable medium and can include software program instructions, that when executed by the processor 1609, cause the computing system 1600 to perform one or more of the functions described herein. Any software program instructions discussed in this description or shown in the drawings can be referred to as computer-readable program instructions, or more simply, program instructions, or a software application. A set of program instructions (e.g., a portion of a software application) can be referred to as a module or a logic module.

As another example, the program instructions can be executable by the processor 1609 to determine a payment has been received by the user interface 1602 (e.g., by the acceptor 1606) and thereafter allow a performance of a computer-implemented game to be output in response to an input entered via the user interface 1602.

The memory 1630 can also include operating system software on which the computing system 1600 can operate. For example, the computing system 1600 can operate on a Windows®-based operating system available from the Microsoft® Corporation of Redmond, Washington. Other examples of an operating system are possible.

The memory 1630 can include a database. As an example, the memory 1630 can include a credit account database containing data related to performing an outcome event by a computing system, as well as adjusting account balances (e.g., quantities of credits) associated with client computing systems. The processor 1609 can write data into the database and read data within the database.

Figure 17:
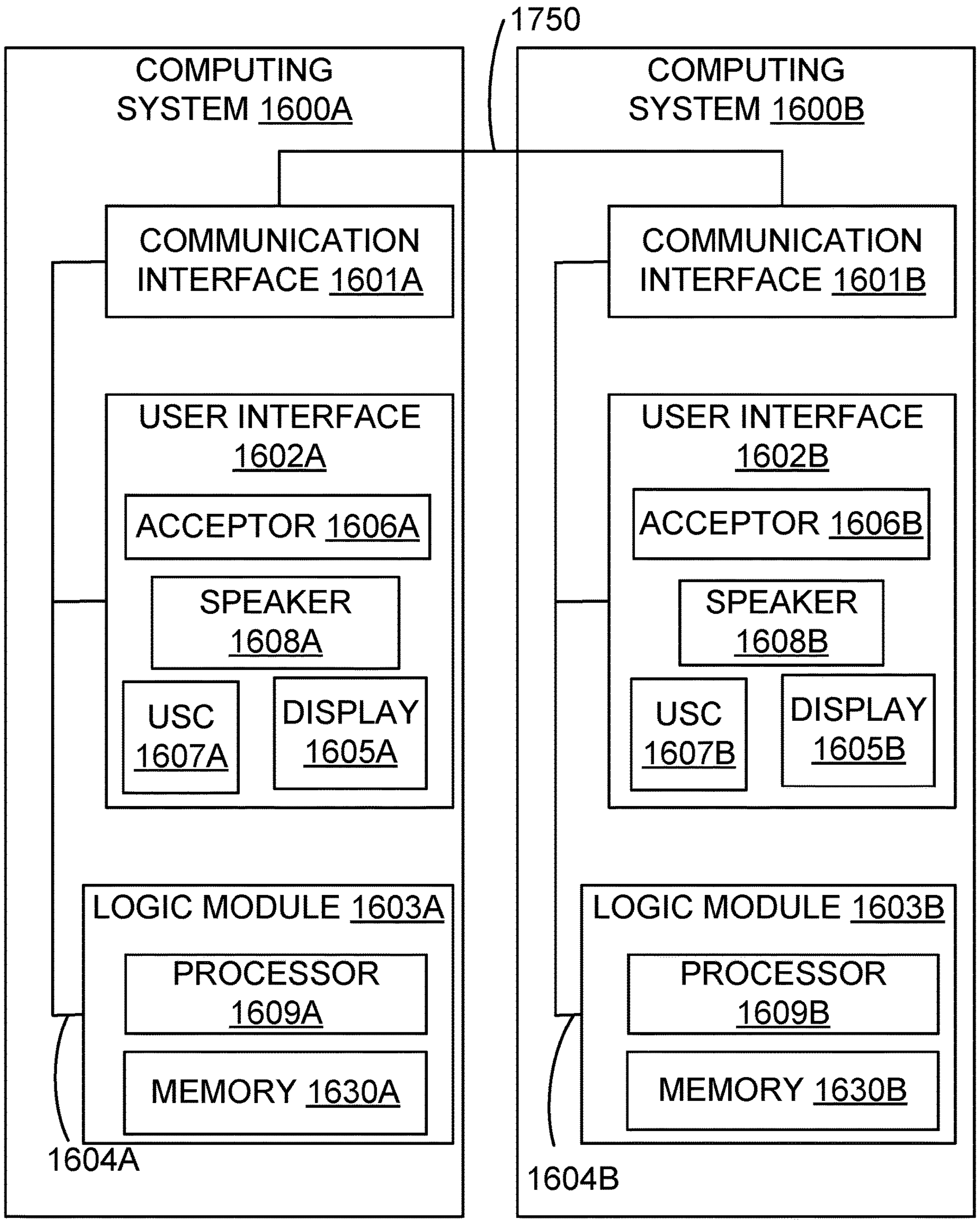
FIG. 17 is a block diagram of two computing systems connected to one another via a computer network in accordance with the example embodiments.

FIG. 17 is a block diagram of a computing system 1600A connected to a computing system 1600B over a communication network 1750. A configuration of elements including the computing system 1600A and the computing system 1600B can be referred to as a server-client based configuration.

The components of the computing system 1600A and the computing system 1600B are shown with corresponding "A" and "B" reference numerals (i.e., based on the computing system 1600). For example, the computing system 1600A includes a communication interface 1601A, a user interface 1602A (which includes a display 1605A, an acceptor 1606A, a user-selectable control 1607A, and/or a speaker 1608A), a logic module 1603A (which includes a processor 1609A and/or a memory 1630A), and a connection mechanism 1604A. Likewise, the computing system 1600B includes a communication interface 1601B, a user interface 1602B (which includes a display 1605B, an acceptor 1606B, a user-selectable control 1607B, and/or a speaker 1608B), a logic module 1603B (which includes a processor 1609B and/or a memory 1630B), and a connection mechanism 1604B. In at least some embodiments, the acceptor 1606A includes a validator, and the acceptor 1606B includes a paper money acceptor, a coin acceptor, a validator, and/or a card reader.

The computing system 1600A is configured to communicate with the computing system 1600B over the communication network 1750 (via the communication interface 1601A and the communication interface 1601B). Likewise, the computing system 1600B is configured to communicate with the computing system 1600A over the communication network 1750. For purposes of this description, any data described as being sent or transmitted by the computing system 1600A can include data sent by the communication interface 1601A over the communication network 1750. Similarly, any data described as being sent or transmitted by the computing system 1600B can include data sent by the communication interface 1601B over the communication network 1750. Furthermore, for purposes of this description, any data described as being received by the computing system 1600A can include data the computing system 1600A receives from the communication network 1750 using communication interface 1601A. Similarly, any data described as being received by the computing system 1600B can include data the computing system 1600B receives from the communication network 1750 using the communication interface 1601B.

In at least some embodiments, the communication network 1750 includes a local area network (LAN), such as a LAN located at least partially within a casino. In accordance with those embodiments, multiple instances of the computing system 1600B dispersed throughout the casino can communicate with the computing system 1600A. In some cases, the computing system 1600A can be located within the casino. In some other cases, the computing system 1600A can be located away from the casino.

In another example, the communication network 1750 can include a wide-area network (WAN), such as an Internet network or a network of the World Wide Web. In such a configuration, the computing system 1600B can communicate with the computing system 1600A via a website portal (for a virtual casino) hosted on the computing system 1600A. The data described herein as being transmitted by the computing system 1600A to the computing system 1600B or by the computing system 1600B to the computing system 1600A can be transmitted as datagrams according to the user datagram protocol (UDP), the transmission control protocol (TCP), or another protocol, and/or a file (e.g., a hypertext transfer protocol file) or some other type of file or communication.

The communication network 1750 can include any of a variety of network topologies and network devices. The communication network 1750 can include a wireless and/or wired network topology and network devices operable on one or both of those network topologies. As an example, the communication network 1750 can include a public switched telephone network, a cable network, a cellular wireless network, a wide area network (WAN), a local area network, an IEEE® 802.11 standard for wireless local area networks (wireless LAN) (which is sometimes referred to as a WI-FI® standard) (e.g., 802.11a, 802.11b, 802.11g, 802.11n, or 802.11p), and/or a network operating according to a BLUETOOTH® standard (e.g., the BLUETOOTH® standard 5.3) developed by the Bluetooth Special Interest Group (SIG) of Kirkland, Washington.

As noted, the computing system 1600 can include the acceptor 1606. In at least some embodiments, the acceptor 1606 includes an acceptor of a physical item associated with a monetary value, such as a paper money acceptor, a coin acceptor, or a card reader. The acceptor 1606 can include a validator configured to identify the physical item, and determine whether the physical item is suitable as payment to the computing system 1600. A coin acceptor can be configured to accept and identify a coin distributed by a geo-political body or a token generated for an organization other than a geo-political body, such as a casino. A card reader can be configured to read a bank card (e.g., a credit or debit card) or a customer card (e.g., a casino loyalty card).

In at least some embodiments, the computing system 1600 can also physically dispense a corresponding award or payout (e.g., cash), or otherwise facilitate the payout (by adding funds to an electronic account associated with a customer card). Such an activity can be triggered by a cash out button either on the display 1605 or elsewhere on the computing system 1600. In at least some embodiments, the user interface 1602 includes a payout device to dispense the payout (e.g., a cash payout). As an example, the user interface 1602 includes one or more of a coin hopper, a coin counter, a coin dispenser, a coin tray, a bill (i.e., currency) chamber, a bill counter, and/or or a bill dispenser to dispense the payout. Additionally or alternatively to determining the payout amount, the computing system 1600 can perform other actions to award the user. For instance, the computing system 1600 can display an indication of a tangible prize. Other types of awards can be used as well.

For purposes of this description, a function that can be performed by the computing system 1600, the computing system 1600A, or the computing system 1600B can be performed, at least in part, by a processor of that computing system executing program instructions and/or a software application. Those program instructions and/or software application can be stored within the memory 1630, 1630A, or 1630B, respectively.

A memory can include one or more memories. For example, a memory can include the memory 1630. As another example, a memory can include the memory 1630A and the memory 1630B. In accordance with this latter example, a memory can be arranged as a distributed memory. One or more processors can be operatively coupled to a memory. For example, the processor 1609 is operatively coupled to the memory 1630. As another example, the processor 1609A is operatively coupled to the memory 1630A, and the processor 1609B is operatively coupled to the memory 1630B. In accordance with this latter example, a processor can be arranged as a distributed processor.

Figure 18:
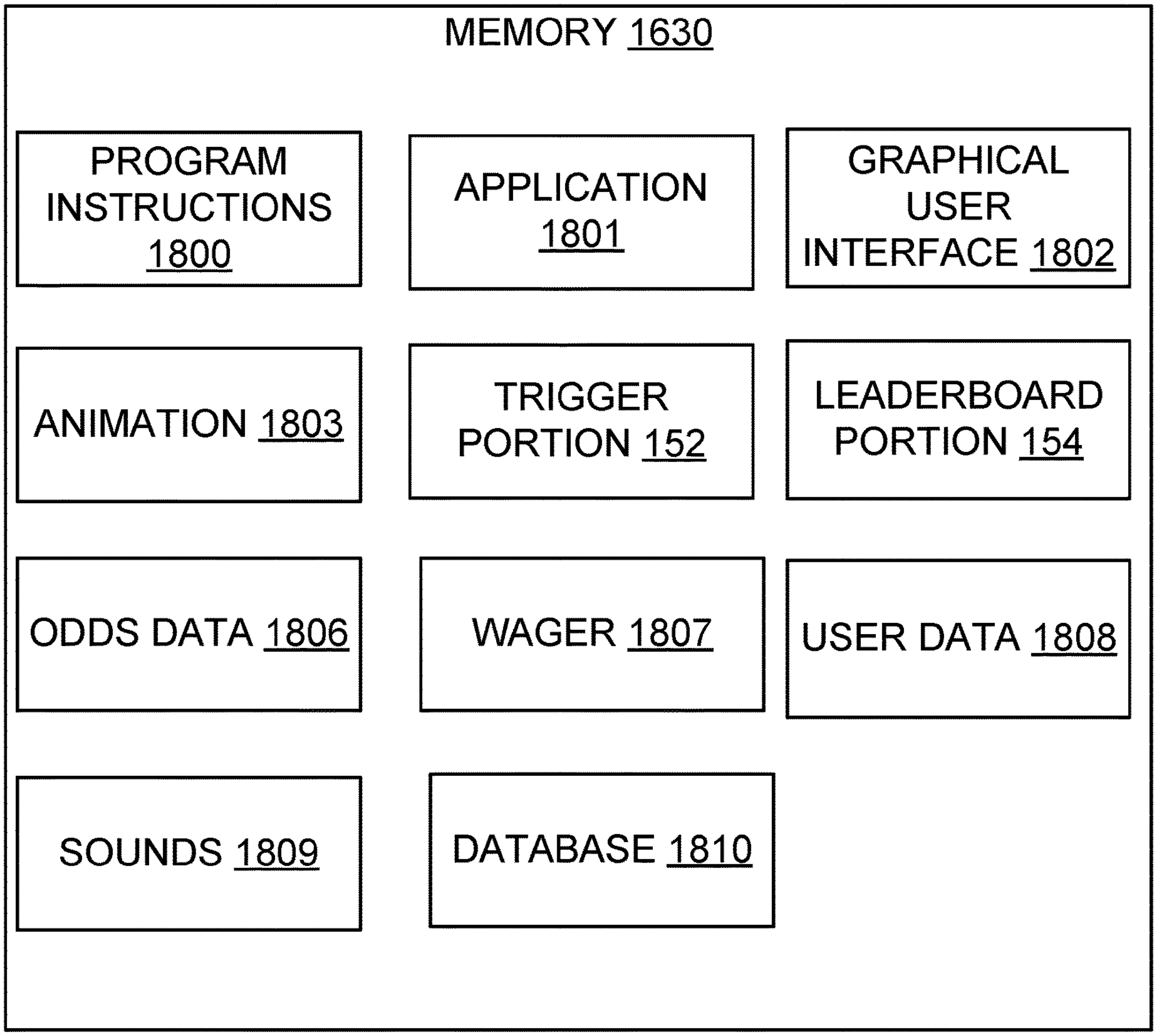
FIG. 18 shows data that can be stored in a memory in accordance with the example embodiments.

FIG. 18 shows data that can be stored in the memory 1630 in accordance with the example embodiments. The memory 1630A and/or the memory 1630B can include some or all of the content shown in FIG. 18. The memory 104 shown in FIG. 1 can include some or all of the content shown in and/or discussed with respect to FIG. 18. The description of the memory 1630 refers to the processor 1609. A person having ordinary skill in the art will understand that a different processor (e.g., the processor 1609A, 1609B, 110) can read and/or write to a memory (e.g., the memory 1630A, 1630*b*, 104) including content shown and/or described with respect to FIG. 18. In at least some embodiments, at least a portion of the content shown in FIG. 18 is embodied as a data register within a processor.

As shown in FIG. 18, the memory 1630 includes program instructions 1800, an application 1801, a graphical user interface 1802, an animation 1803, the trigger portion 152 of the jackpot prize pool 150, leaderboard portion 154 of the jackpot prize pool 150, odds data 1806, a wager 1807, user data 1808, sounds 1809, and/or a database 1810.

The program instructions 1800 can include computer-readable program instructions (e.g., machine-readable instructions) executable by one or more processors. The program instructions 1800 can be executable to cause a computing system or a component of the computing system to perform any function(s) described in this description.

The application 1801 can include one or more applications. The program instructions 1800 or a portion of the program instructions 1800 can be embodied in the application 1801. The application 1801 can include any software application discussed in this description. Additionally or alternatively, the application 1801 can include an operating system, such as any operating system described in this description, or a browser application to request a web service from a server that serves an example game to a client computing system.

The graphical user interface 1802 includes one or more graphical user interfaces. As an example, the graphical user interface 1802 can include a graphical user interface that can be output on a display (e.g., the display 1605, 1605A, 1605B) or the display screen 112. As yet another example, the graphical user interface 1802 can include a template that specifies a particular animation of the animation 1803 to be shown while the graphical user interface is output on the display. The graphical user interface 1802 can include a GUI embodied with a user-selectable control, such as a user-selectable control corresponding to a selectable option disclosed on one or more of the drawings.

The animation 1803 can include one or more animations. The animation 1803 can include computer-readable files containing animations for outputting on a display, such as the display 1605, 1605A, 1605B. As an example, the animation 1803 can include animation files, such as an animation file with one of the following file name extensions: GIF, PNG, MPEG, JPEG, SVG, or some other file name extension. Each animation in the animation 1803 can correspond to an index value such that the processor 1609A can provide the processor 1609B with an instruction including a particular index value so that the processor 1609B outputs via the display 1605B an animation file corresponding to the particular index value. Accordingly, the processor 1609A does not have to transmit the animation file to the processor 1609B each time the animation file is to be output via the display 1605B.

As an example, the animation 1803 can include an animation that shows a roulette ball landing on a spinning roulette wheel and the roulette ball moving on the roulette wheel in a direction opposite of the spinning roulette wheel, the roulette ball dropping into a roulette wheel pocket, and the roulette wheel stopping. An animation can show the roulette wheel spinning clockwise or counter-clockwise.

As another example, the animation 183 can include an animation that shows a set of reels of a reel-based slots game spinning and then stopping with particular symbols on the set of reels positioned on one or more paylines or payways.

As yet another example, the animation 1803 can include an animation that shows a casino chip or chips being placed on the roulette table to designate the number(s) being selected for a wager. The animation can represent multiple casino chips as a stack of casino chips. The animation of casino chip placement can be based on movement of a computer mouse of the user interface 1602, 1602A, 1602B.

As still yet another example, the animation 1803 can include an animation that shows a prize wheel spinning and then stopping with a particular multiplier value disposed adjacent to a pointer. As still yet another example, the animation 1803 can include an animation that shows a coin flip representing a determination of whether to activate a trigger mode of an example game.

X. Conclusions

While one or more disclosed functions have been described as being performed by a server (e.g., the server 102) or a computing system (e.g., the computing systems 1500, 1600, 1600A, 1600B), one or more of the functions can be performed by any entity, including but not limited to those described herein. As such, while this disclosure includes examples in which the computing system 1600A performs select functions and sends data to the computing system 1600B, such that the computing system 1600B can perform complementing functions and receive the data, variations to those functions can be made while adhering to the general server-client dichotomy and the scope of the disclosed machines, computing systems, and methods.

For example, rather than the computing system 1600A sending select data to the computing system 1600B, such that the computing system 1600B can generate and display appropriate images, the computing system 1600A can generate the images, animations, or graphical user interfaces and send them to the computing system 1600B for display. Indeed, it will be appreciated by one of ordinary skill in the art that the "break point" between the server computing system's functions and the client computing system's functions can be varied.

Furthermore, the functions described throughout this can be performed in an order different than an order of functions (if any) described herein or shown in the drawings. Additionally, embodiments in the form of a method can include one or more of the functions described herein or shown in the drawings. Even more, for this description, the use of ordinal numbers such as "first," "second," "third" and so on can be used to distinguish respective elements. The use of ordinal numbers can also denote an order of elements, a first element in a sequence of a method need not be an initial element in a method sequence, but rather it may be a first element discussed in a portion of the description.

Furthermore still, while examples have been described in terms of select embodiments, alterations and permutations of these embodiments will be apparent to those of ordinary skill in the art. Other changes, substitutions, and alterations are also possible without departing from the disclosed machines, computing systems, and methods in their broader aspects as set forth in the claims below.

Finally, one or more embodiments described above may relate to one or more of the following enumerated example embodiments (EEE).

EEE 1 is a method comprising: generating, by a processor, a leaderboard for a computer-implemented game, the leaderboard including a list of players that are ranked according to points acquired by each player; determining, by the processor, that a particular player triggered a jackpot associated with the computer-implemented game; allocating, by the processor, a trigger portion of a jackpot prize pool to the particular player, the jackpot prize pool associated with the jackpot; and allocating, by the processor and based on a ranking of each player in the list of players, a leaderboard portion of the jackpot prize pool among players in the list of players.

EEE 2 is the method of EEE 1, further comprising: notifying, by the processor, the particular player that the particular player has triggered the jackpot and has won the trigger portion of the jackpot prize pool; and notifying, by the processor, each player in the list of players that the jackpot was triggered.

EEE 3 is the method of EEE 1 or 2, notifying, by the processor, a first player in the list of players of a first prize amount awarded to the first player, the first prize amount based on the leaderboard portion of the jackpot prize pool and a ranking of the first player on the leaderboard; and notifying, by the processor, a second player in the list of players of a second prize amount awarded to the second player, the second prize amount based on the leaderboard portion of the jackpot prize pool and a ranking of the second player on the leaderboard.

EEE 4 is the method of any one of EEE 1 to 3, further comprising: prior to the particular player triggering the jackpot, notifying, by the processor, each player in the list of players of their potential winnings if the jackpot is triggered, wherein the potential winnings of each player in the list of players is based on the leaderboard portion of the jackpot prize pool and based on a ranking of each player in the list of players.

EEE 5 is the method of any one of EEE 1 to 4, wherein the points acquired by a first player in the list of players are based on wager amounts from the first player during the computer-implemented game.

EEE 6 is the method of any one of EEE 1 to 5, wherein the points acquired by a first player in the list of players are based on random multipliers applied to wager amounts from the first player during the computer-implemented game.

EEE 7 is the method of any one of EEE 1 to 6, wherein the points acquired by a first player in the list of players are increased in response to the first player placing a wager after experiencing consecutive losing wagers.

EEE 8 is the method of any one of EEE 1 to 7, wherein the points acquired by a first player in the list of players are based on an account usage rate of the first player.

EEE 9 is the method of any one of EEE 1 to 8, wherein the leaderboard is a global level leaderboard, a market level leaderboard, or a brand level leaderboard.

EEE 10 is the method of any one of EEE 1 to 9, wherein the leaderboard portion of the jackpot prize pool is allocated among the list of players included on the leaderboard in response to a top player on the list of players having a point total that satisfies a threshold point total.

EEE 11 is the method of any one of EEE 1 to 10, wherein the leaderboard portion of the jackpot prize pool is allocated among the list of players included on the leaderboard in response to at least a particular number of players on the list of players having a point total that satisfies a threshold point total.

EEE 12 is the method of any one of EEE 1 to 11, wherein the leaderboard portion of the jackpot prize pool is allocated among the list of players included on the leaderboard in response to a sum of the points acquired by each player on the list of players satisfying a threshold point total.

EEE 13 is the method of any one of EEE 1 to 12, wherein the jackpot prize pool is a progressive prize pool, and wherein each player in the list of players has contributed to the jackpot prize pool.

EEE 14 is the method of any one of EEE 1 to 13, wherein generating the leaderboard includes: designating, by the processor, data storage for storing the leaderboard and game result data, wherein the game result data corresponds to performances of a base game and is used to determine changes in the leaderboard during performance of the computer-implemented game, and wherein the game result data includes a respective quantity of points acquired for each performance of the base game; and writing, by the processor, the respective quantity of points acquired for each performance of the base game contemporaneously with receiving a wager contribution for that performance of the base game.

EEE 15 is the method of any one of EEE 1 to 14, wherein designating the data storage occurs upon completion of a prior performance of the computer-implemented game.

EEE 16 is the method of any one of EEE 1 to 15, wherein the computer-implemented game includes a roulette game, a blackjack game, a poker game, or a reel-based slots game.

EEE 17 is a computing system comprising: a processor, and a non-transitory computer-readable memory storing executable instructions, wherein execution of the executable instructions by the processor causes a computing system to perform the method of any one of EEE 1 to 16.

EEE 18 is a non-transitory computer-readable memory having stored therein instructions executable by a processor to cause a computing system to perform the method of any one of EEE 1 to 16.

The invention claimed is:

1. A method comprising:

generating, by a processor at a server, a leaderboard for a computer-implemented game, the leaderboard including a list of players that are ranked according to points acquired by each player, wherein generating the leaderboard includes:

designating, by the processor, data storage for storing game result data, wherein the game result data corresponds to performances of the computer-implemented game by each player in the list of players, wherein the game result data includes a respective quantity of points acquired for each performance, and wherein the performances are from different computing devices communicatively coupled to the server; and writing, by the processor, leaderboard data into the data storage, wherein the leaderboard data indicates the respective quantity of points acquired for each performance with receiving a wager contribution for that performance, wherein the leaderboard is generated based on the leaderboard data;

determining, by the processor, that a particular player, identified in the stored list of players, triggered a jackpot associated with the computer-implemented game;

allocating, by the processor, a trigger portion of a jackpot prize pool to the particular player identified in the stored list of players, the jackpot prize pool associated with the jackpot; and allocating, by the processor and based on a ranking of each player identified in the stored list of players, a leaderboard portion of the jackpot prize pool among players in the stored list of players.

2. The method of claim 1, further comprising:

notifying, by the processor, the particular player that the particular player has triggered the jackpot and has won the trigger portion of the jackpot prize pool; and notifying, by the processor, each player in the list of players that the jackpot was triggered.

3. The method of claim 2, further comprising:

notifying, by the processor, a first player in the list of players of a first prize amount awarded to the first player, the first prize amount based on the leaderboard portion of the jackpot prize pool and a ranking of the first player on the leaderboard; and notifying, by the processor, a second player in the list of players of a second prize amount awarded to the second player, the second prize amount based on the leaderboard portion of the jackpot prize pool and a ranking of the second player on the leaderboard.

4. The method of claim 1, further comprising:

prior to the particular player triggering the jackpot, notifying, by the processor, each player in the list of players of their potential winnings if the jackpot is triggered, wherein the potential winnings of each player in the list of players is based on the leaderboard portion of the jackpot prize pool and based on a ranking of each player in the list of players.

5. The method of claim 1, wherein the points acquired by a first player in the list of players are based on wager amounts from the first player during the computer-implemented game.

6. The method of claim 1, wherein the points acquired by a first player in the list of players are based on random multipliers applied to wager amounts from the first player during the computer-implemented game.

7. The method of claim 1, wherein the points acquired by a first player in the list of players are increased in response to the first player placing a wager after experiencing consecutive losing wagers.

8. The method of claim 1, wherein the points acquired by a first player in the list of players are based on an account usage rate of the first player.

9. The method of claim 1, wherein the leaderboard is a global level leaderboard, a market level leaderboard, or a brand level leaderboard.

10. The method of claim 1, wherein the leaderboard portion of the jackpot prize pool is allocated among the list of players included on the leaderboard in response to a top player on the list of players having a point total that satisfies a threshold point total.

11. The method of claim 1, wherein the leaderboard portion of the jackpot prize pool is allocated among the list of players included on the leaderboard in response to at least a particular number of players on the list of players having a point total that satisfies a threshold point total.

12. The method of claim 1, wherein the leaderboard portion of the jackpot prize pool is allocated among the list of players included on the leaderboard in response to a sum of the points acquired by each player on the list of players satisfying a threshold point total.

13. The method of claim 1, wherein the jackpot prize pool is a progressive prize pool, and wherein each player in the list of players has contributed to the jackpot prize pool.

14. The method of claim 1, wherein designating the data storage occurs upon completion of a prior performance of the computer-implemented game.

15. The method of claim 1, wherein the jackpot prize pool is determined by the processor and corresponds to a rolling summed up value that is maintained since a previous jackpot, associated with the computer-implemented game, was triggered.

16. A computing system comprising:
a processor; and
a non-transitory computer-readable memory comprising executable instructions, where execution of the executable instructions by the processor cause the processor to perform operations comprising:
generating a leaderboard for a computer-implemented game, the leaderboard including a list of players that are ranked according to points acquired by each player, wherein generating the leaderboard includes:
designating, by the processor, data storage for storing game result data, wherein the game result data corresponds to performances of the computer-implemented game by each player in the list of players, wherein the game result data includes a respective quantity of points acquired for each performance, and wherein the performances are from different computing devices communicatively coupled to the server; and
writing, by the processor, leaderboard data into the data storage, wherein the leaderboard data indicates the respective quantity of points acquired for each performance with receiving a wager contribution for that performance, wherein the leaderboard is generated based on the leaderboard data;
determining that a particular player, identified in the stored list of players, triggered a jackpot associated with the computer-implemented game;
allocating a trigger portion of a jackpot prize pool to the particular player identified in the stored list of players, the jackpot prize pool associated with the jackpot; and
allocating, based on a ranking of each player identified in the stored list of players, a leaderboard portion of the jackpot prize pool among players in the stored list of players.

17. The computing system of claim 16, wherein the operations further comprise:
notifying the particular player that the particular player has triggered the jackpot and has won the trigger portion of the jackpot prize pool; and
notifying each player in the list of players that the jackpot was triggered.

18. The computing system of claim 17, wherein the operations further comprise:
notifying a first player in the list of players of a first prize amount awarded to the first player, the first prize amount based on the leaderboard portion of the jackpot prize pool and a ranking of the first player on the leaderboard; and
notifying a second player in the list of players of a second prize amount awarded to the second player, the second prize amount based on the leaderboard portion of the jackpot prize pool and a ranking of the second player on the leaderboard.

19. A non-transitory computer-readable medium comprising instructions that, when executed by a processor, cause the processor to perform functions comprising:
generating a leaderboard for a computer-implemented game, the leaderboard including a list of players that are ranked according to points acquired by each player, wherein generating the leaderboard includes:
designating, by the processor, data storage for storing game result data, wherein the game result data corresponds to performances of the computer-implemented game by each player in the list of players, wherein the game result data includes a respective quantity of points acquired for each performance, and wherein the performances are from different computing devices communicatively coupled to the server; and
writing, by the processor, leaderboard data into the data storage, wherein the leaderboard data indicates the respective quantity of points acquired for each performance with receiving a wager contribution for that performance, wherein the leaderboard is generated based on the leaderboard data;
determining that a particular player, identified in the stored list of players, triggered a jackpot associated with the computer-implemented game;
allocating a trigger portion of a jackpot prize pool to the particular player identified in the stored list of players, the jackpot prize pool associated with the jackpot; and
allocating, based on a ranking of each player identified in the stored list of players, a leaderboard portion of the jackpot prize pool among players in the stored list of players.

20. The non-transitory computer-readable medium of claim 19, wherein the points acquired by a first player in the list of players are based on wager amounts from the first player during the computer-implemented game.

* * * * *